United States Patent
Ito et al.

(10) Patent No.: US 9,540,002 B2
(45) Date of Patent: Jan. 10, 2017

(54) TARGET RECOGNITION APPARATUS

(71) Applicant: DENSO CORPORATION, Kariya, Aichi-pref. (JP)

(72) Inventors: Yosuke Ito, Okazaki (JP); Akiyoshi Mizutani, Nagoya (JP)

(73) Assignee: DENSO CORPORATION, Kariya, Aichi (JP)

(*) Notice: Subject to any disclaimer, the term of this patent is extended or adjusted under 35 U.S.C. 154(b) by 123 days.

(21) Appl. No.: 14/546,573

(22) Filed: Nov. 18, 2014

(65) Prior Publication Data

US 2015/0142208 A1  May 21, 2015

(30) Foreign Application Priority Data

Nov. 19, 2013 (JP) .................... 2013-239116

(51) Int. Cl.
*B60W 30/00* (2006.01)
*B60W 30/09* (2012.01)
*B60W 30/085* (2012.01)
*B60W 40/02* (2006.01)

(52) U.S. Cl.
CPC ............ *B60W 30/09* (2013.01); *B60W 30/085* (2013.01); *B60W 40/02* (2013.01); *B60W 2420/52* (2013.01); *B60W 2520/10* (2013.01); *B60W 2520/14* (2013.01); *B60W 2540/18* (2013.01)

(58) Field of Classification Search
CPC .... B60W 30/09; B60W 30/085; B60W 40/02; B60W 2420/52; B60W 2520/10; B60W 2520/14; B60W 2540/18
USPC .......................................................... 701/1
See application file for complete search history.

(56) References Cited

U.S. PATENT DOCUMENTS

| 6,122,040 A | 9/2000 | Arita et al. |
| 8,027,029 B2 * | 9/2011 | Lu .................... G01S 7/4802 356/28 |
| 9,328,548 B2 * | 5/2016 | Shiraishi ............. E05F 15/77 |

(Continued)

FOREIGN PATENT DOCUMENTS

| JP | H04-245600 | 9/1992 |
| JP | H10-119673 | 5/1998 |

(Continued)

OTHER PUBLICATIONS

Office Action dated Sep. 24, 2015 in corresponding Japanese Application No. 2013-239116 with English translation.

*Primary Examiner* — Richard Camby
(74) *Attorney, Agent, or Firm* — Harness, Dickey & Pierce, P.L.C.

(57) ABSTRACT

A target recognition apparatus includes a detecting unit and an estimating unit. The detecting unit detects an object that is present in a traveling direction of a vehicle, and acquires information for estimation that is used to perform an object type estimation to presume whether or not the detected object is an object to be used in control for enabling the vehicle to perform a predetermined operation. The estimating unit performs the object type estimation based on the information for estimation. When a predetermined first condition is met, the control for enabling the vehicle to perform a predetermined operation is prohibited or suppressed. The predetermined first condition indicates that erroneous estimation may occur in the object type estimation.

9 Claims, 18 Drawing Sheets

(56) References Cited

U.S. PATENT DOCUMENTS

2005/0100192 A1\* 5/2005 Fujimura ........... G06K 9/00369
382/103
2009/0201192 A1 8/2009 Tokoro et al.

FOREIGN PATENT DOCUMENTS

| | | |
|---|---|---|
| JP | 11-045119 | 2/1999 |
| JP | 11-142520 | 5/1999 |
| JP | 2002-225587 | 8/2002 |
| JP | 2003-084064 A | 3/2003 |
| JP | 2003-154870 | 5/2003 |
| JP | 2005-202878 | 7/2005 |
| JP | 2007-132748 | 5/2007 |
| JP | 2008-129871 | 6/2008 |
| JP | 2009-252198 | 10/2009 |
| JP | 2010-086269 A | 4/2010 |
| JP | 2010-093610 | 4/2010 |
| JP | 2012-192862 | 10/2012 |

\* cited by examiner

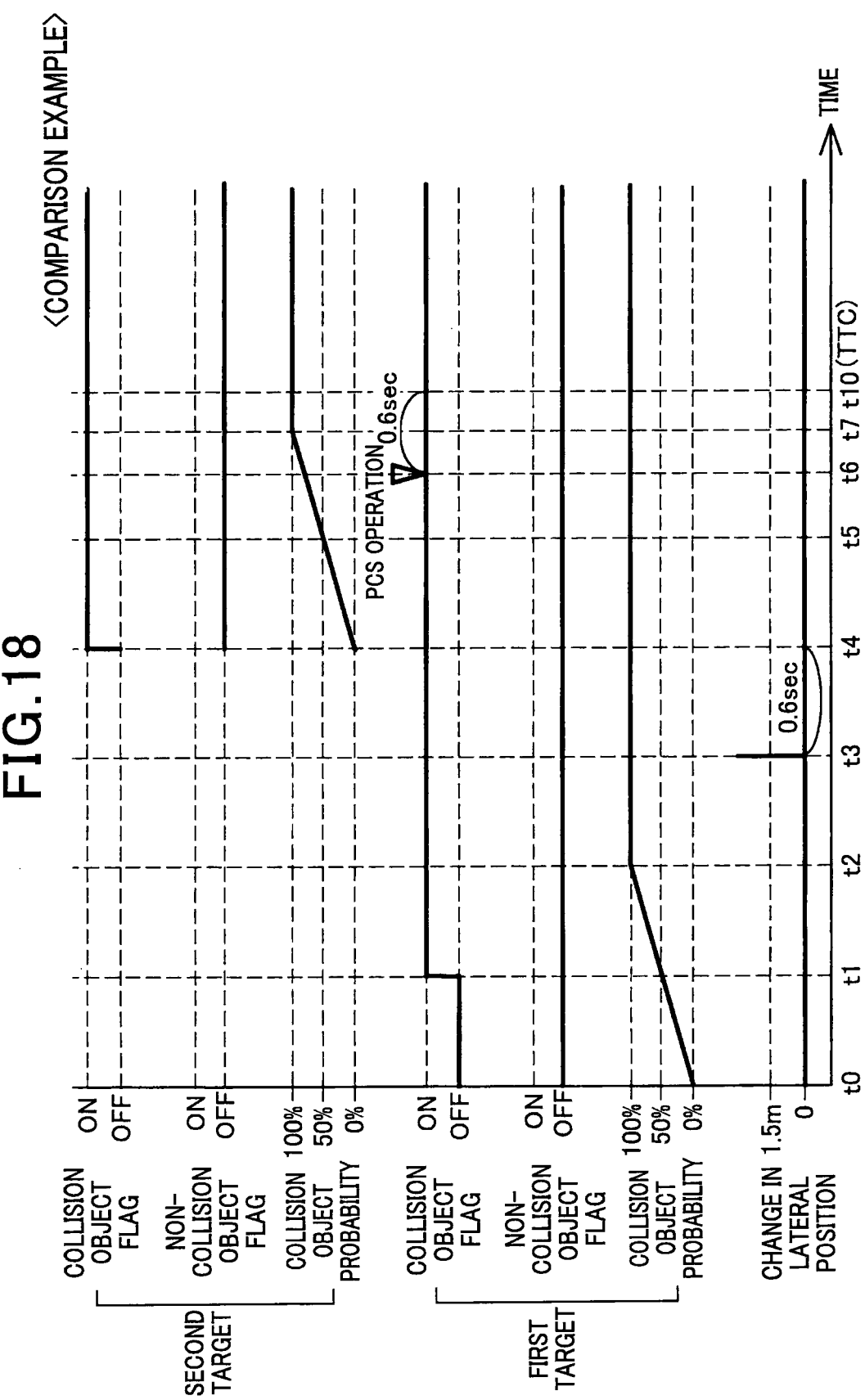

TARGET RECOGNITION APPARATUS

CROSS-REFERENCE TO RELATED APPLICATION

This application is based on and claims the benefit of priority from Japanese Patent Application No. 2013-239116, filed Nov. 19, 2013, the disclosure of which is incorporated herein in its entirety by reference.

BACKGROUND

Technical Field

The present invention relates to a target recognition apparatus.

Related Art

Pre-crash safety (referred to, hereinafter, as "PCS" (registered trademark)) is known that enables a vehicle to perform operations when an object (such as a preceding vehicle, an oncoming vehicle, a guardrail, a manhole cover and other iron plates, or a pedestrian) ahead of the vehicle is detected using a millimeter-wave radar or the like and the probability of a collision between the detected object and the vehicle is determined to be high. The operations that are performed are, for example, an operation to avoid collision (such as a warning or automatic braking) and an operation to reduce impact caused by a collision (such as automatic braking or automatic seatbelt retraction).

PCS control requires the capability to reliably operate its control in response to an object with which the probability of collision is high. At the same time, PCS control requires the capability to suppress the operation of unnecessary control in response to an object with which the probability of collision is low. In this way, PCS control is required to actualize both of the two contradictory capabilities at a high level. Therefore, accurate identification of the type of object ahead is required.

JP-A-2007-132748 describes a technique in which a detected object is presumed to be an automobile when the reception strength of reflection waves in the millimeter-wave radar is relatively high. The detected object is presumed to be a pedestrian when the reception strength is relatively low.

In the technique in which the type of object is presumed based on the reception strength of reflection waves in the millimeter-wave radar, as described above, a problem occurs in that erroneous estimation (classification) of the type of object may occur depending on the cruising state of the vehicle.

For example, a guardrail is set along a curve. A manhole is set on a road surface near the guardrail in the vicinity of the curve exit. In this situation, from the perspective of the vehicle, the manhole and a portion of the guardrail may overlap in the vicinity of the curve entrance. In this case, based on the reflection waves from the manhole and the reflection waves from the portion of the guardrail, the manhole and the portion of the guardrail may be erroneously presumed to be a single object with which the probability of collision is high.

When an erroneous estimation of the type of object such as this occurs, unnecessary control is performed immediately before the vehicle passes over the manhole. For example, automatic braking or automatic seatbelt retraction is performed. Therefore, the above-described conventional technique has room for improvement in terms of improving the capabilities of PCS control.

The above-described issue is not limited to PCS control. Rather, the issue is a common issue among vehicle control in which an object that meets predetermined conditions is detected from ahead of the vehicle and the vehicle is made to perform a predetermined operation related to the detected object. Such vehicle control includes, in addition to PCS, adaptive cruise control (referred to, hereinafter, as "ACC"), lane keep assist (referred to, hereinafter, as "LKA"), lane departure warning (referred to, hereinafter, as "LDW"), and the like.

SUMMARY

It is thus desired to solve at least some of the above-described issues. The present disclosure can be actualized by the following aspects.

An exemplary embodiment of the present disclosure provides a target recognition apparatus that is mounted to a vehicle and includes a detecting unit and an estimating unit (classifying unit). The detecting unit detects an object that is present in the traveling direction of a vehicle. The detecting unit then acquires information for estimation (classification) that is used to perform an object type estimation (object type classification). The object type estimation is performed to presume whether or not the detected object is an object to be used in control for enabling the vehicle to perform a predetermined operation. The estimating unit performs the object type estimation based on the information for estimation. When a predetermined first condition is met, the control for enabling the vehicle to perform a predetermined operation is prohibited or suppressed. The predetermined first condition indicates that erroneous estimation may occur in the object type estimation.

In this target recognition apparatus, when the predetermined first condition indicating that erroneous estimation may occur in the object type estimation is met, the control for enabling the vehicle to perform a predetermined operation is prohibited or suppressed. Therefore, the control for enabling the vehicle to perform a predetermined operation can be suppressed or prohibited in a situation in which the predetermined operation should not be performed based on the actual type of object.

In addition, when the predetermined first condition indicating that erroneous estimation may occur in the object type estimation is not met, or in other words, in a situation where it is highly likely that erroneous estimation will not occur in the object type estimation, the vehicle can be made to perform the predetermined operation in a situation in which the predetermined operation should be performed based on the actual type of object. In this way, in the target recognition apparatus according to the exemplary embodiment, capabilities of vehicle control can be improved.

The target recognition apparatus may further include an operation control unit that enables the vehicle to perform the predetermined operation when a predetermined second condition is met. The predetermined second condition indicates that the probability of a collision between the vehicle and the object is high. When the first condition is met, the operation control unit may suppress or prohibit the control for enabling the vehicle to perform a predetermined operation when the second condition is met.

In this target recognition apparatus, even when the probability of a collision between the vehicle and the object is high, the control for enabling the vehicle to perform a predetermined operation can be suppressed or prohibited if erroneous estimation in the object type estimation is likely to occur. Therefore, operation of unnecessary control can be suppressed or prohibited with further certainty.

The target recognition apparatus may further includes a steering angle detecting unit that detects the steering angle of a steering in the vehicle. The first condition may include a condition that the steering angle is a predetermined angle or more. When the steering angle is the predetermined angle or more, a plurality of types of objects that are present in parallel to the traveling direction of the vehicle appear to be overlapped from the perspective of the vehicle. Therefore, for example, the plurality of types of objects may be detected as a single object. In such instances, erroneous estimation in the object type estimation may occur regarding any of the plurality of types of objects. However, enabling the vehicle to inadvertently perform a predetermined operation regarding such objects can be suppressed.

Not all of the plurality of constituent elements included in each aspect of the above-described present disclosure are essential. Some constituent elements among the plurality of constituent elements may be modified, omitted, exchanged with other new constituent elements, or be modified to remove some limitations as appropriate to solve some or all of the above-described issues or to achieve some or all of the effects described in the present specification.

In addition, some or all of the technical features included in the exemplary embodiment may be combined with some or all of the technical features included in another exemplary embodiment, thereby forming a separate exemplary embodiment of the present disclosure, to solve some or all of the above-described issues or to achieve some or all of the effects described in the present specification.

The present disclosure can be actualize by various aspects other than the target recognition apparatus. For example, the present disclosure can be actualized by aspects such as a vehicle control apparatus, a vehicle control method, a vehicle control system, or a vehicle including such apparatus or system.

BRIEF DESCRIPTION OF THE DRAWINGS

In the accompanying drawings:

FIG. 18 is a timing chart of changes in two types of flags, collision object probability, and amount of change in lateral position in a comparison example according to the second embodiment.

DESCRIPTION OF THE EMBODIMENTS

A. First Embodiment

A-1. Configuration of a Vehicle

Figure 1:
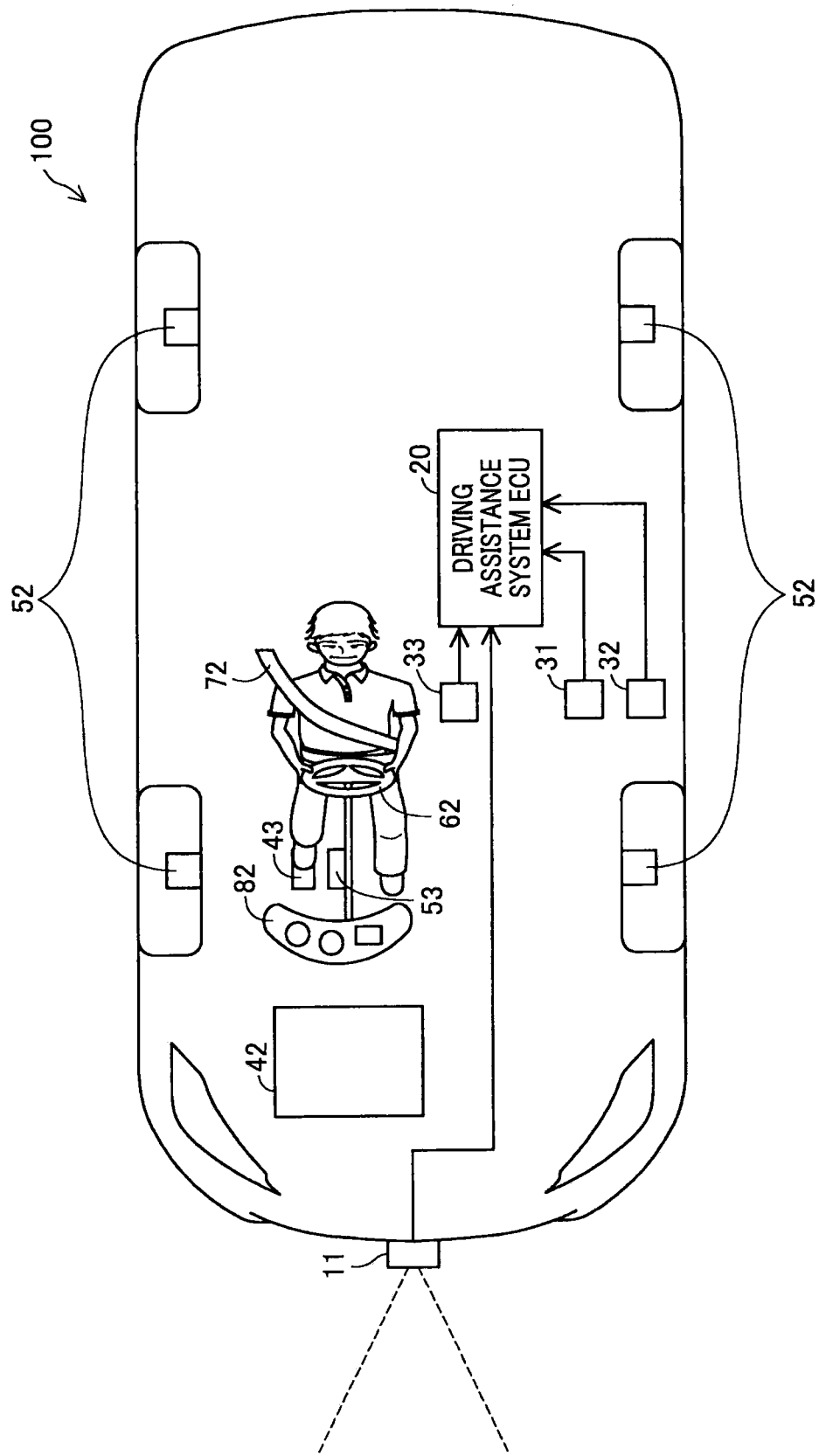
FIG. 1 is an explanatory diagram schematically showing a configuration of a vehicle according to a first embodiment.
Figure 2:
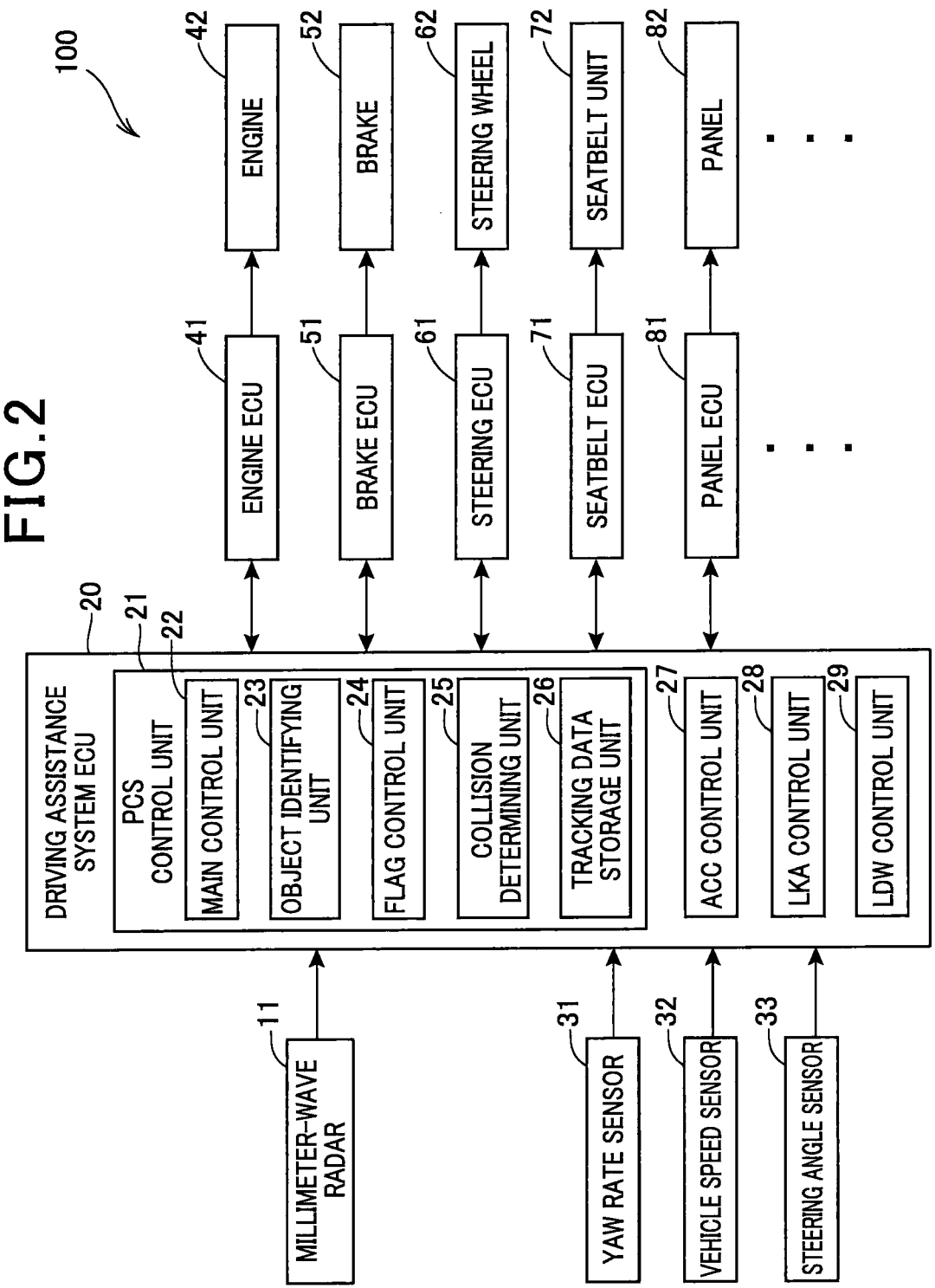
FIG. 2 is a block diagram schematically showing the configuration of the vehicle according to the first embodiment.

A target recognition apparatus is applied to a vehicle 100 as an embodiment of the present disclosure. As shown in FIG. 1 and FIG. 2, the vehicle 100 includes an engine 42, a brake 52, a steering wheel 62, a seatbelt unit 72, and an instrument panel (referred to, hereinafter, as simply a "panel") 82. The engine 42 generates driving force of the vehicle 100. The brake 52 decelerates (stops) the vehicle 100. The steering 62 steers the vehicle 100. The seatbelt unit 72 restrains a passenger to a seat. The panel 82 displays various types of information.

In addition, the vehicle 100 includes a millimeter-wave radar 11, a yaw rate sensor 31, a vehicle speed sensor 32, and a steering angle sensor 33.

The millimeter-wave radar 11 uses millimeter-wave band radio waves to detect whether or not an object (such as a preceding vehicle, an oncoming vehicle, a guardrail, or a manhole) is present ahead of the vehicle 100. The millimeter-wave radar 11 also detects (when the object is present) the distance between the vehicle 100 and the object, the lateral position of the object, the size of the object, and the relative speed of the object in relation to the vehicle 100.

According to the present embodiment, the above-described "lateral position" refers to the distance from a virtual line to the object. The virtual line passes through the center of the vehicle 100 along the traveling direction of the vehicle 100. In addition, according to the present embodiment, the "size of the object" refers to the maximum length of the object along the traveling direction of the vehicle 100 and the maximum length of the object along a direction that is perpendicular to the traveling direction and parallel to a horizontal plane.

The yaw rate sensor 31 detects the yaw rate (rotation angular velocity) of the vehicle 100. The vehicle speed sensor 32 detects the speed of the vehicle 100. The steering angle sensor 33 detects the steering angle of the steering 62.

In the present specification, "ahead of the vehicle 100" refers to an area on the front side of a plane that passes through a front end point (or a rear end point) of the vehicle 100 and is perpendicular to the front/rear direction of the vehicle 100. "Ahead of the vehicle 100" is not limited to an area within the width of the vehicle 100 in the horizontal direction (the left and right end points of the vehicle 100), within the area on the front side.

The vehicle 100 includes an engine electronic control unit (ECU; the same applies hereafter) 41, a brake ECU 51, a steering ECU 61, a seatbelt ECU 71, a panel ECU 81, and a driving assistance system ECU 20. The engine ECU 41 controls the engine 42. The brake ECU 51 controls the brake 52. The steering ECU 61 controls the steering 62. The seatbelt ECU 71 controls the seatbelt unit 71. The panel ECU 81 controls the panel 82. Each ECU includes a central processing unit (CPU) and a storage area. The CPU runs a program stored in the storage area, thereby actualizing control by the ECU.

The driving assistance system ECU 20 acquires information from each sensor (the millimeter-wave radar 11, the yaw rate sensor 31, the vehicle speed sensor 32, and the steering angle sensor 33). The driving assistance system ECU 20 then performs various types of control to assist in driving of the vehicle 100 based on the acquired information.

The driving assistance system ECU 20 includes a PCS control unit 21. The PCS control unit 21 performs PCS control as one type of driving assistance control. PCS control enables, through the respective ECUs, the units of the vehicle 100 to perform operations when the probability of a collision between an object ahead of the vehicle 100 and the vehicle 100 is determined to be high. The operations performed by the units include an operation to avoid collision and an operation to reduce impact caused by a collision.

Specifically, the PCS control unit 21 performs one or a plurality of types of control among the following types of control, based on whether the probability of a collision between the vehicle 100 and the object is high or low:

(1) control to automatically close a throttle valve of the engine 42 (regardless of the state of a throttle pedal 43);

(2) control to increase assistance hydraulic pressure in the brake 52 and improve responsiveness of the brake 52 to operation of a brake pedal 53;

(3) control to decelerate (stop) the vehicle 100 by automatically activating the brake 52 (regardless of the state of the brake pedal 53);

(4) control to perform automatic steering by the steering 62 so that the traveling direction of the vehicle 100 is changed to a direction in which collision with the object is avoided;

(5) control to vibrate the steering of the steering 62 to warn the driver;

(6) control to reduce the movement of a passenger during a collision by automatically retracting the seatbelt of the seatbelt unit 72; and (7) control to emit light or sound from the panel 82 to warn the driver.

The PCS control unit 21 includes, as functional units for performing the above-described PCS control, a main control unit 22, an object identifying unit 23, a flag control unit 24, a collision determining unit 25, and a tracking data storage unit 26.

The main control unit 22 controls the overall PCS control unit 21. The object identifying unit 23 detects an object ahead and identifies the object based on information acquired from the millimeter-wave radar 11. The flag control unit 24 sets a collision object flag and a non-collision object flag to ON or OFF. The collision object flag and the non-collision object flag will be described hereafter.

The collision determining unit 25 determines whether or not the probability of a collision between the vehicle 100 and the detected object is high. The tracking data storage unit 26 stores therein various types of information (such as type, position, size, and speed) related to the detected object (target). Details of each functional unit will be described hereafter in the descriptions regarding an object identification process, a new object determination process, a flag control process, and a PCS control process.

The driving assistance system ECU 20 also includes an ACC control unit 27 that performs ACC control, a LKA control unit 28 that performs LKA control, and a LDW control unit 29 that performs LDW control.

In ACC control, while the vehicle 100 is controlled so as to maintain a preset speed, the vehicle 100 is decelerated when there is risk of the distance to a preceding vehicle detected by a sensor becoming shorter than a preset value. In LKA control, a lane marker on the road is detected using a sensor. The vehicle 100 is enabled to perform an operation to avoid lane departure when the vehicle 100 is determined to be likely to depart from the lane. In LDW control, when the vehicle 100 is similarly determined to be likely to depart from the lane, a warning is issued to the driver by light, sound, vibrations, or the like.

According to the present embodiment, the driving assistance system ECU 20 corresponds to a target recognition apparatus in the claims. In addition, the main control unit 22 corresponds to an operation control unit in the claims. The millimeter-wave radar 11 corresponds to a detecting unit in the claims. The object identifying unit 23 corresponds to an estimating unit (classifying unit) and a position identifying unit in the claims. The steering angle sensor 33 corresponds to a steering angle detecting unit in the claims. The tracking data storage unit 26 corresponds to a storage unit in the claims. Reception strength of reflection waves from an object and detection point correspond to information used for estimation (classification) in the claims.

A-2. Object Identification Process

Figure 3:
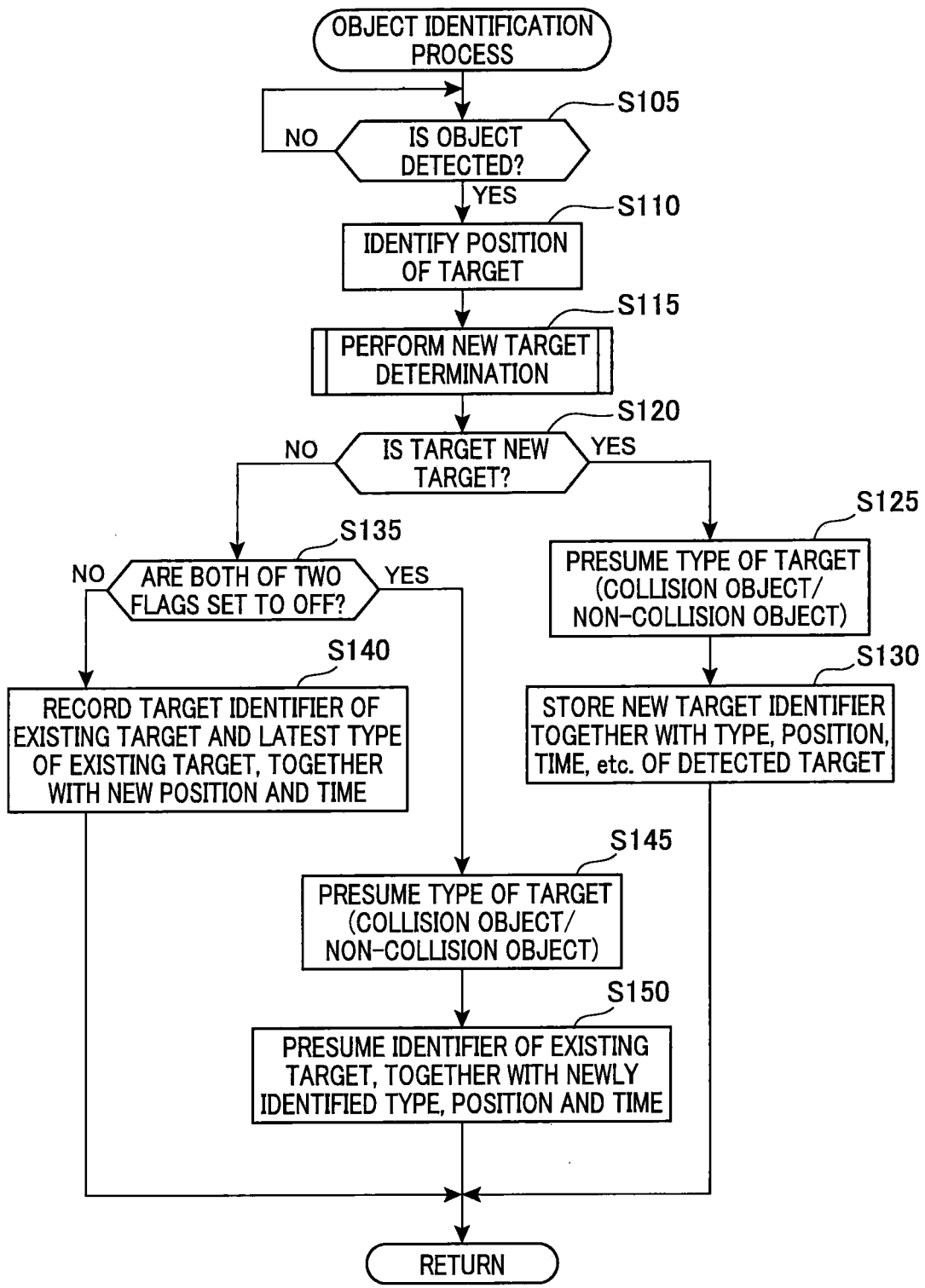
FIG. 3 is a flowchart of the flow of an object identification process according to the first embodiment.

The object identifying unit 23 of the driving assistance system ECU 20 repeatedly performs the object identification process shown in FIG. 3 during a period in which the ignition is ON.

First, the object identifying unit 23 waits until an object ahead is detected based on the reception state of reflection waves in the millimeter-wave radar 11 (step S105). When an object is detected (YES at step S105), the object identifying unit 23 identifies the position of the object (target) based on the reception state of the reflection waves (step S110).

At above-described step S105, detection is not limited to only the detection of a single individual object as a single object. Different sections of a single object (such as a guardrail described hereafter) may be detected as different targets. In addition, different objects may be detected as a single target.

According to the present embodiment, the "position of the object (target)" is identified by the distance from the vehicle 100 to the object and the lateral position of the target. A known method can be used as the method for detecting an object and identifying the position using the reception state of reflection waves in the millimeter-wave radar 11.

Figure 4:
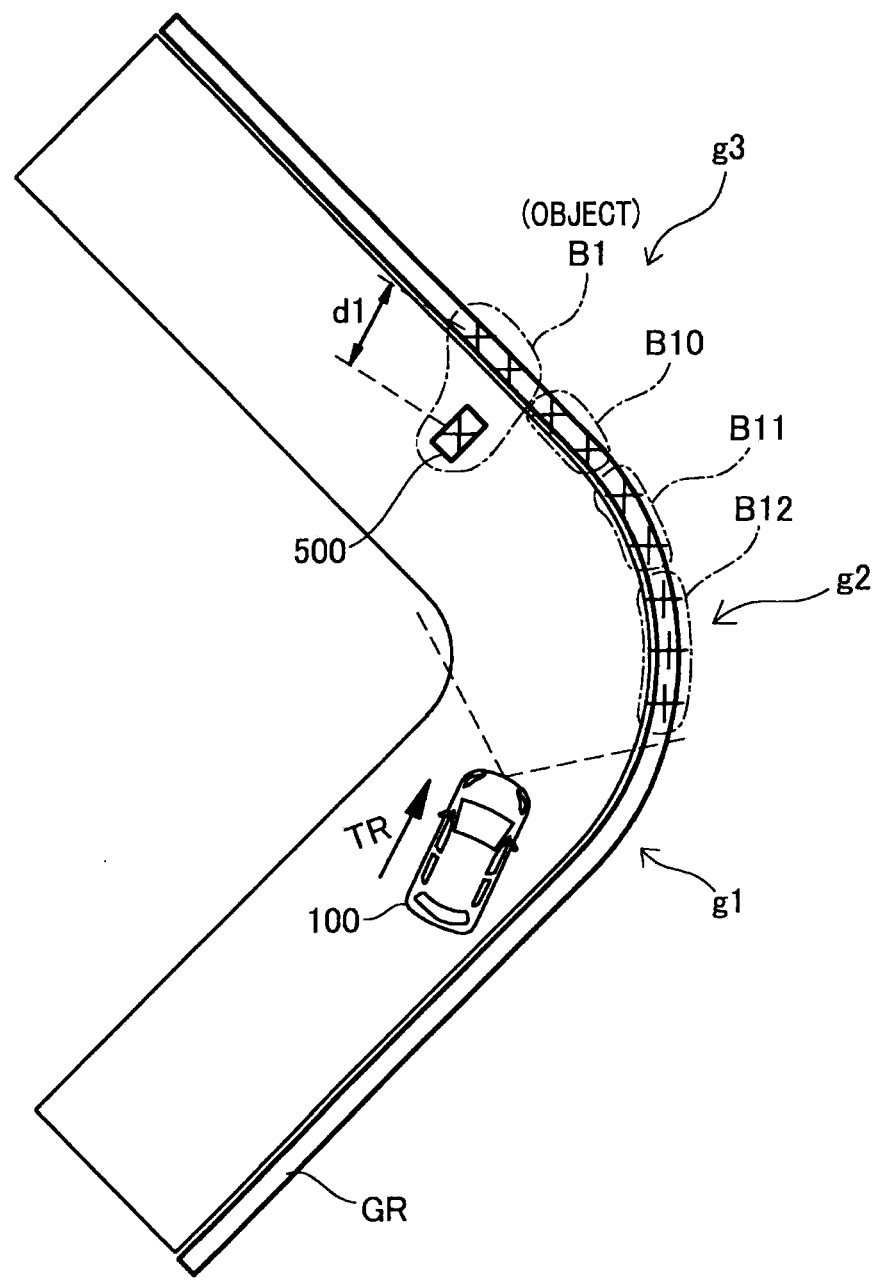
FIG. 4 is a first explanatory diagram of a cruising state of the vehicle according to the first embodiment.

For example, as shown in FIG. 4, the vehicle 100 receives a plurality of reflection waves from a guardrail GR and an iron plate 500 that are ahead of the vehicle at a curve entrance g1. Among the output points of the reflection waves, or in other words, the reflection points of the radio waves outputted from the millimeter-wave radar 11 (referred to, hereinafter, as "detection points"), the object identifying unit 23 groups detection points that are near one another at step S105.

The object identifying unit 23 detects each group as a target and identifies the position of each target. In FIG. 4, the detection point is expressed by a cross symbol. In the example in FIG. 4, four targets B1, B10, B11, and B12 are detected. The positions thereof are identified.

Here, the target B1 is composed of two detection points on the guardrail GR and a single detection point on the iron plate 500. The iron plate 500 is disposed in a position near the guardrail GR in the vicinity of a curve exit g3.

As shown in FIG. 4, in a state in which the vehicle 100 is approaching the curve entrance g1, the iron plate 500 that is present in the vicinity of the curve exit g3 is present in parallel with the guardrail GR along the traveling direction of the vehicle 100. Therefore, the iron plate 500 and the guardrail GR appear to overlap from the perspective of the vehicle 100. As a result, the single target B1 is detected from the single detection point on the iron plate 500 and the two detection points on the guardrail GR as described above.

According to the present embodiment, the target B1 is detected as a target for the first time when the vehicle 100 approaches the curve entrance g1. The other three targets B10, B11, and B12 are each composed of two or three detection points on the guardrail GR.

Figure 5:
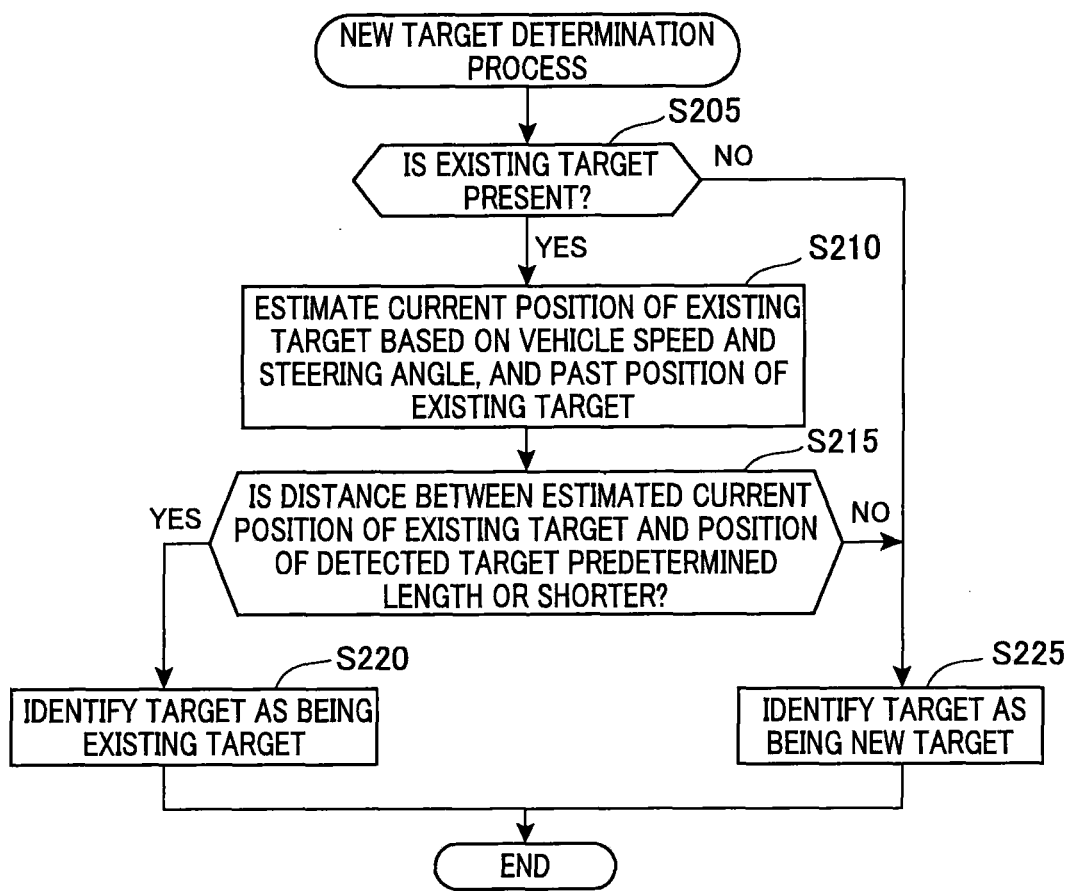
FIG. 5 is a flowchart of the flow a new target determination process according to the first embodiment.

As shown in FIG. 3, the object identifying unit 23 performs a new target determination process (step S115). Specifically, as shown in FIG. 5, the object identifying unit 23 determines whether or not an existing target is present based on information recorded in the tracking data storage unit 26 (step S205).

At step S205, when determined that an existing target is not present (NO at step S205), the object identifying unit 23 identifies the detected target as a new target (step S225). On the other hand, when determined that an existing target is present at step S205 (YES at step S205), the object identifying unit 23 estimates the current position of the existing target based on the speed and steering angle of the vehicle 100 and the past position of the existing target (step S210).

According to the present embodiment, the "existing target" refers to a target that has been detected as an object at previously performed step S105.

The object identifying unit 23 calculates the distance between the current position of the existing target estimated at step S210 and the position of the target identified at step S110 in FIG. 3. The object identifying unit 23 then determines whether or not the distance is a predetermined length or shorter (step S215).

When determined that the distance between the estimated current position of the existing target and the position of the object is the predetermined length or shorter (YES at step S215), the object identifying unit 23 identifies the target (referred to, hereinafter, as a "detected target") detected at step S105 as being an existing target (step S220).

When determined that the distance between the estimated current position of the existing target and the position of the object is not the predetermined length or shorter (in other words, the distance is longer than the predetermined length) (NO at step S215), the object identifying unit 23 performs above-described step S225. The object identifying unit 23 identifies the detected target as being a new target.

As shown in FIG. 3, the object identifying unit 23 determines whether or not the detected target is identified as being a new target as a result of the new target determination process (step S115) (step S120). When determined that the detected target is a new target (YES at step S120), the object identifying unit 23 presumes the type (collision object or non-collision object) of the target (step S125). Specifically, the object identifying unit 23 presumes the type of the detected target to be either a collision object or a non-collision object.

According to the present embodiment, the above-described "collision target" refers to an object or a portion of an object with high probability of collision with the vehicle 100, such as a guardrail or another vehicle. In other words, the collision object refers to a type of object or a portion of such object that collides with the vehicle 100 in a state in which the distance between the object and the vehicle 100 is zero.

In addition, according to the present embodiment, the "non-collision object" refers to an object or a portion of an object with which the probability of collision is low because the vehicle 100 is capable of passing over the object, such as a manhole or other iron plates. In other words, the non-collision object refers to a type of object or a portion of such object that does not collide with the vehicle 100 in a state in which the distance between the vehicle 100 and the object is zero.

As described hereafter, PCS control is operated when the probability of collision of the vehicle 100 with the collision object is high. Therefore, estimation (classification) of the type of target at step S125 corresponds to estimation of whether or not the object is to be used for PCS control.

According to the present embodiment, whether the detected target is a collision object or a non-collision object is presumed based on the depth of the object (the length of the object along the traveling direction of the vehicle 100). Specifically, when the depth of the target is a predetermined length or longer, the target is presumed to be a collision object. When the depth of the target is less (shorter) than the predetermined length, the target is presumed to be a non-collision object.

For example, as described above, the target B1 shown in FIG. 4 is first detected when the vehicle 100 is approaching the curve entrance g1. Therefore, whether or not depth d1 of the target B1 is the predetermined length or longer is detected. In the example in FIG. 4, the depth d1 is the predetermined length or longer. Therefore, the target B1 is presumed to be a collision object (object).

As shown in FIG. 3, the object identifying unit 23 stores, in the tracking data storage unit 26, a new target identifier together with the type of detected target, the position of the target identified at step S110, the time of detection of the target at step S105, and the like (step S130). The target identifier is an identifier used to uniquely identify the detected target.

When determined that the detected target is not a new target (in other words, the detected target is an existing target) at above-described step S120 (NO at step S120), the object identifying unit 23 determines whether or not both of two flags, a collision object flag and a non-collision object flag, are set to OFF (step S135).

The PCS control unit 21 is provided with a collision object flag and a non-collision object flag for each target. Each flag is set to ON or OFF. The collision object flag indicates whether or not the type of object is presumed to be the collision object. The collision object flag being set to ON indicates that the object is presumed to be a collision object. The non-collision object flag indicates whether or not the type of object is presumed to be the non-collision object. The non-collision object flag being set to ON indicates that object is presumed to be a non-collision object. ON/OFF switching of the two flags will be described in the description related to the flag control process hereafter.

At above-described step S135, when determined that at least either of the two flags is not set to OFF (NO at step S135), the object identifying unit 23 stores, in the tracking data storage unit 26, the target identifier of the existing target and the latest type of the existing target, together with the position of the target (latest position) identified at step S110, the time of detection of the object at step S105, and the like. The "latest type" refers the type associated with the newest time, among the various pieces of data on the existing target stored in the tracking data storage unit 26.

At above-described step S135, when determined that both of the two flags are set to OFF (YES at step S135), the object identifying unit 23 presumes the type of the detected target (collision object or non-collision object) (step S145). Step S145 is the same as above-described step S125. Therefore, description thereof is omitted.

The object identifying unit 23 stores, in the tracking data storage unit 6, the target identifier to be attached to the existing target, together with the type of object that has been newly identified at step S145, the position of the target identified at step S110, the time of detection of the object at step S105, and the like (step S150).

A-3. Flag Control Process

Figure 6:
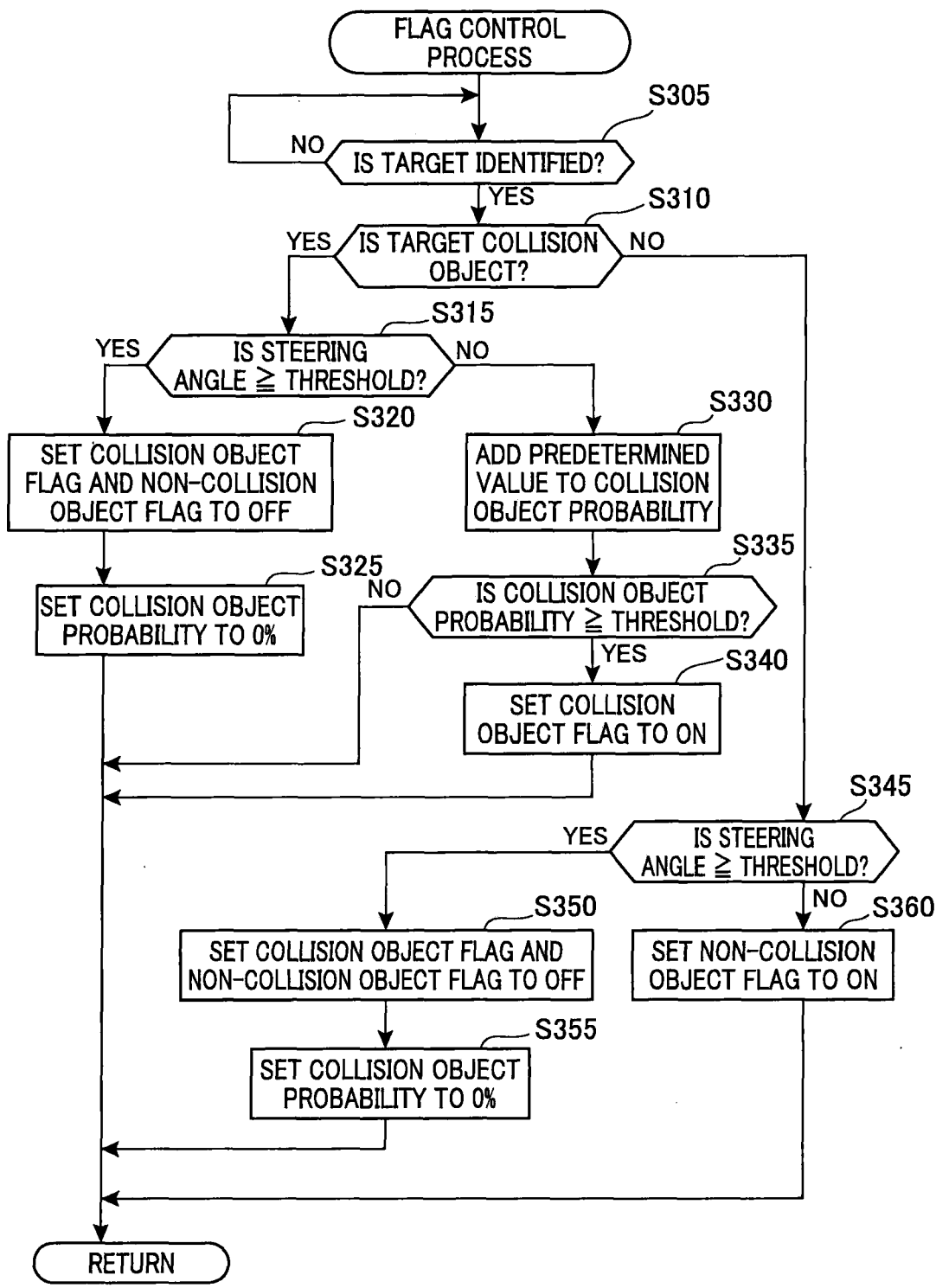
FIG. 6 is a flowchart of the flow of a flag control process according to the first embodiment.

The flag control unit 24 of the driving assistance system ECU 20 repeatedly performs the flag control process shown in FIG. 6 during a period in which the ignition is ON. First, the flag control unit 24 waits until any of the targets is identified in the above-described object identification process (step S305).

When a target is identified (YES at step S305), the flag control unit 24 determines (presumes) whether or not the type of the identified target is the collision object (step S310). According to the present embodiment, the determination at step S310 is performed based on the depth of the target in a manner similar to the determination at step S125 in the above-described object identification process.

When determined (presumed) that the type of the identified target is the collision object (YES at step S310), the flag control unit 24 determines whether or not the steering angle is a threshold or more based on output from the steering angle sensor 33 (step S315). According to the present embodiment, 70° is set in advance as the threshold. The threshold is not limited to 70°. An arbitrary angle may be set as the threshold. "The steering angle is a threshold or more" corresponds to a first condition in the claims.

When determined that the steering angle is the threshold or more (YES at step S315), the flag control unit 24 sets the collision object flag and the non-collision object flag of the identified target to OFF (step S320). The flag control unit 24 sets a collision object probability of the identified target to 0% (step S325). The flag control unit 24 then returns to above-described step S305.

The collision object probability refers to the probability of the target being a collision object. The collision object probability is recorded in the tracking data storage unit 26 for each target and each time a target is identified. As described above, when the steering angle is the threshold or more, the collision object flag and the non-collision object flag are set to OFF. The collision object probability is set to 0%. The reason for this will be described hereafter.

When determined that the steering angle is not the threshold or more at above-described step S315 (NO at step S315), the flag control unit 24 adds a predetermined value to the latest collision object probability of the identified target and identifies the sum as being the new collision object probability (step S330).

According to the present embodiment, the predetermined value to be added at step S330 is set to 5%. The predetermined value to be added is not limited to 5%. An arbitrary percentage may be set as the percentage to be added at step S330. In addition, instead of addition of the predetermined value, multiplication by a predetermined value (such as 1.2) may be performed.

The flag control unit 24 determines whether or not the collision object probability of the identified target is a predetermined threshold or more (step S335). According to the present embodiment, the threshold at step S335 is set to 50%. The threshold is not limited to 50%. An arbitrary percentage may be set as the threshold at step S335.

At above-described step S335, when determined that the collision object probability is the threshold or more (YES at step S335), the flag control unit 24 sets the collision object flag of the identified target to ON (step S340).

On the other hand, when determined at above-described step S335 that the collision object probability is not the threshold or more (NO at step S335), the flag control unit 24 returns to above-described step S305.

When determined (presumed) that the identified target is not a collision object (in other words, the identified target is a non-collision object) at above-described step S310 (NO at step S310), the flag control unit 24 determines whether or not the steering angle is a threshold or more based on output from the steering angle sensor 33 (step S345). Step S345 is the same as above-described step S315. Therefore, description thereof is omitted.

When determined that the steering angle is the threshold or more (YES at step S345), the flag control unit 24 sets the collision object flag and the non-collision object flag of the identified target to OFF (step S350). The flag control unit 24 sets the collision object probability of the identified target to 0% (step S355). The flag control unit 24 then returns to above-described step S305. Step S350 and step S355 are the same as above-described step S320 and step S325. Therefore, descriptions thereof are omitted.

At above-described step S345, when determined that the steering angle is not the threshold or more (NO at step S345), the flag control unit 24 sets the non-collision object flag to ON (step S360).

An example in which the above-described flag control is performed will be described with reference to FIG. 4, FIG. 7, FIG. 8, and FIG. 9.

Figure 7:
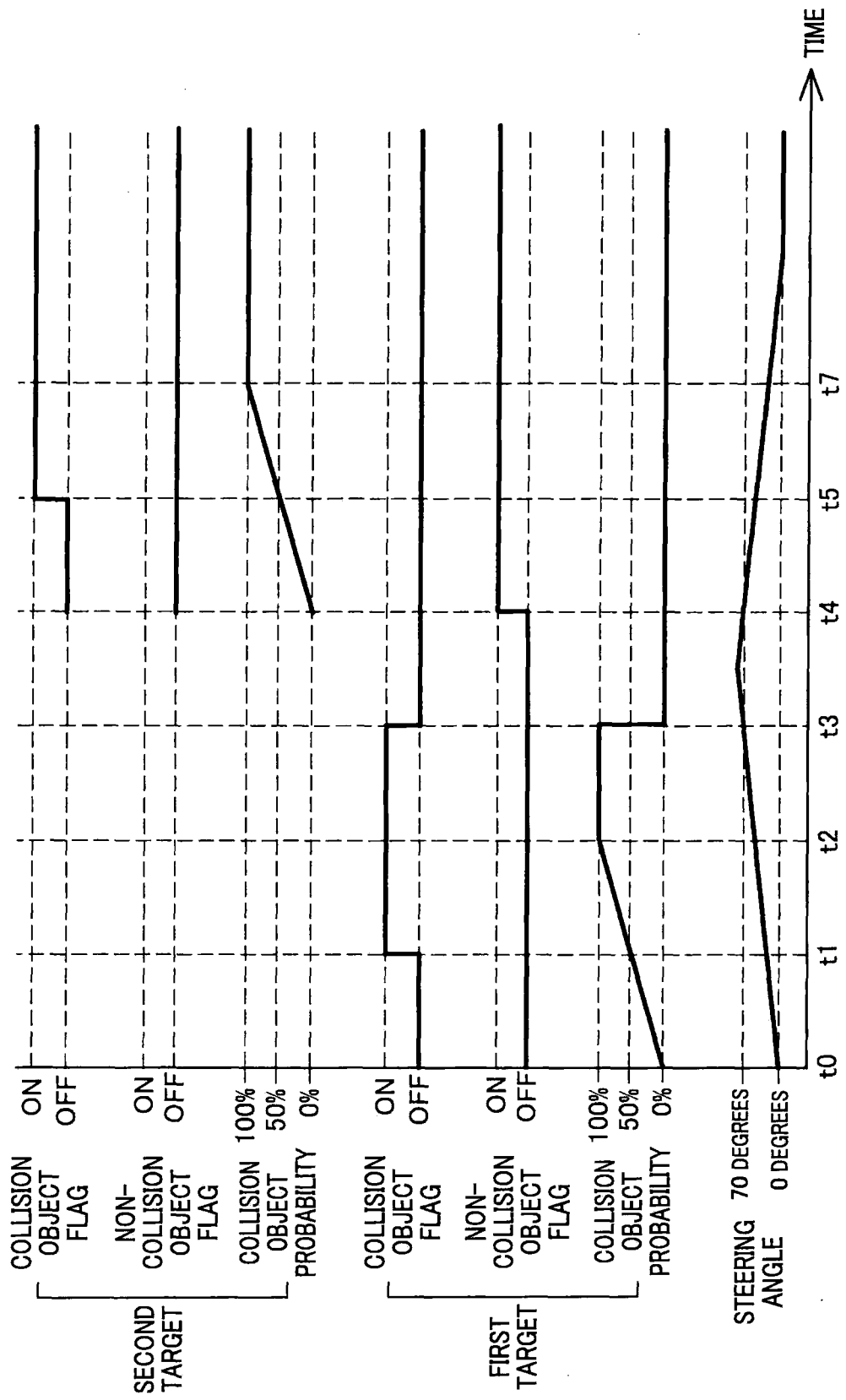
FIG. 7 is a timing chart of the changes in two types of flags, collision object probability, and steering angle according to the first embodiment.

FIG. 7 shows a timing chart of the steering angle of the vehicle 100, the collision object flag, the non-collision object flag, and the collision object probability of a first target, and the collision object flag, the non-collision object flag, and the collision object probability of a second target. Time t0 indicates the time point at which the vehicle 100 approaches the curve entrance g1. The first target refers to the above-described target B1. The second target will be described hereafter.

As shown in FIG. 7, when the vehicle 100 approaches the curve entrance g1, the driver starts to turn the steering. Therefore the steering angle gradually increases. The depth d1 of the first target B1 is the predetermined length or longer from the start of detection. Therefore, the first target B1 is presumed to be a collision object.

Thus, the collision object probability gradually increases every time step S330 in FIG. 6 is performed. When the collision object probability becomes the threshold (50%) or more at time t1, the collision object flag is set to ON. The collision object probability continues to increase. When the collision object probability reaches 100% at time t2, the collision object probability is held at 100%.

Figure 8:
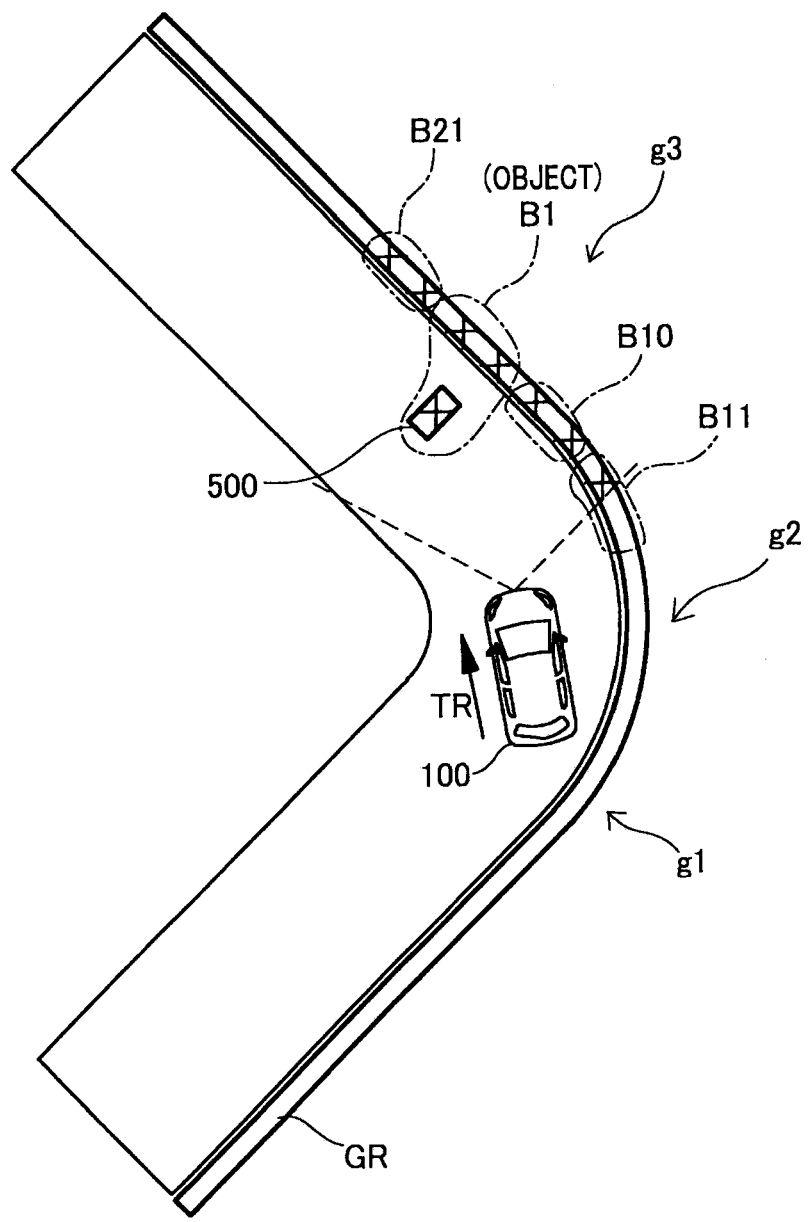
FIG. 8 is a second explanatory diagram of a cruising state of the vehicle according to the first embodiment.

As shown in FIG. 8, as the vehicle 100 reaches the curve center g2, step S320 and step S325 in FIG. 6 are performed for the first target B1 when the steering angle reaches the threshold (70°). As shown in FIG. 7, at time t3, the collision object flag and the non-collision object flag of the first target B1 are set to OFF. In addition, the collision object probability becomes 0%.

Therefore, in the object identification process performed thereafter, step S145 and step S150 shown in FIG. 3 are performed. Therefore, estimation of type is performed again regarding the first target B1. The presumed type, position, time, and the like are stored in the tracking data storage unit 26. In FIG. 8, a new target B21 composed of two detection points on the guardrail GR is identified in a position adjacent to the first target B1.

Figure 9:
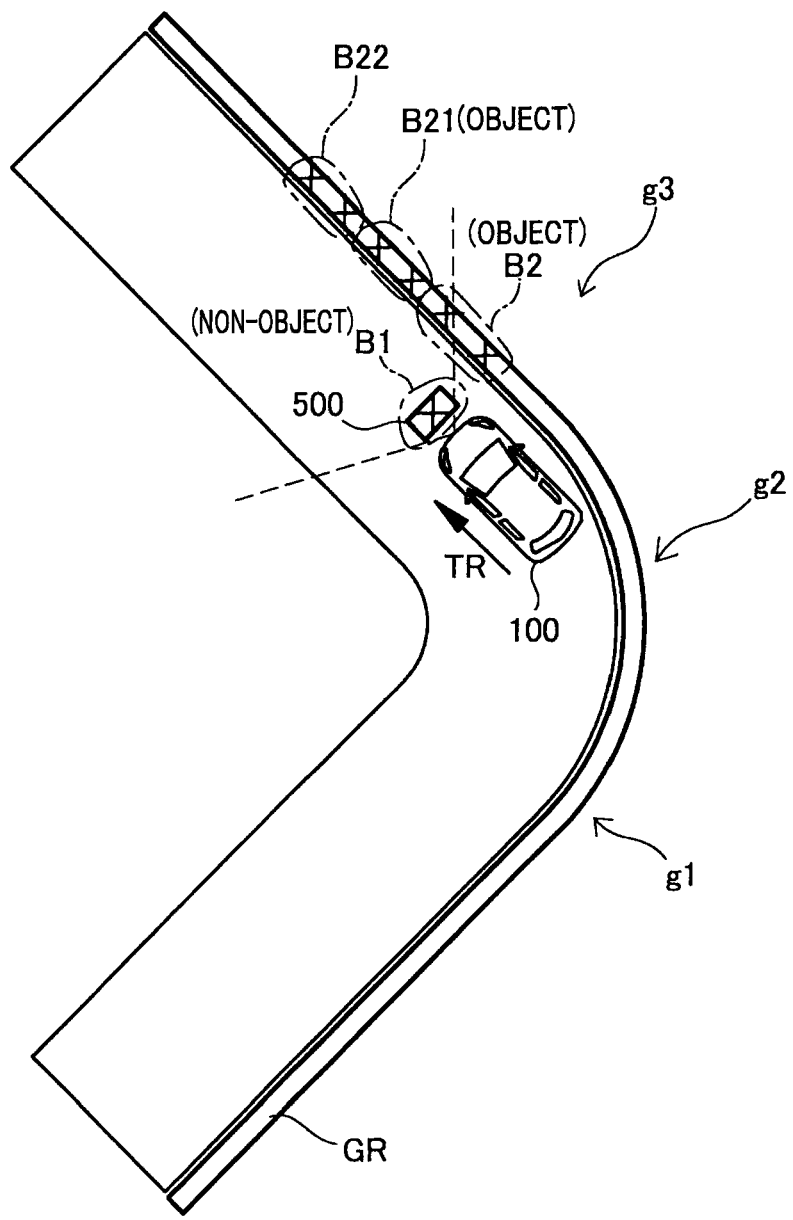
FIG. 9 is a third explanatory diagram of a cruising state of the vehicle according to the first embodiment.

As shown in FIG. 9, when the vehicle 100 reaches the vicinity of the curve exit g3, among the three detection points composing the first target B1, the detection point on the iron plate 500 and the two detection points on the guardrail GR can be identified as being different objects (targets). The reason for this is as follows.

The detection point on the iron plate 500 and two detection points on the guardrail GR are no longer present in parallel with each other in the traveling direction TR. Therefore, the iron plate 500 and the guardrail GR no longer appear overlapped from the perspective of the vehicle 100. In addition, the detection point on the iron plate 500 and the two detection points on the guardrail GR are disposed apart from each other from the perspective of the vehicle 100, so as to be greater than the resolution (such as 3°) of the millimeter-wave radar 11.

In the example in FIG. 9, the single detection point on the iron plate 500 is identified as being the first target B1, which is an existing target. The two detection points on the guardrail GR are identified as being a new target B2.

In the situation shown in FIG. 9, in addition to the target B21 shown in FIG. 8, a new target B22 is identified in a position adjacent to the target B21. The new target B22 is composed of two detection points on the guardrail GR. In the situation such as that shown in FIG. 9, when the steering angle is the threshold for more, step S145 shown in FIG. 3 is performed. The collision object flag and the non-collision object flag of the first target B1 (iron plate 500) are set to OFF. The detection point on the iron plate 500 has no depth.

Therefore, the first target B1 is presumed to be a non-collision object at step S145. As a result, as shown in FIG. 7, at time t4, when the steering angle becomes less than the threshold (70°), step S360 shown in FIG. 6 is performed. As shown in FIG. 7, the non-collision flag of the first target B1 is set to ON.

In addition, the depth of the second target B2 is the predetermined length or longer. Therefore, at the time t4, the second target B2 is identified as being a collision object. Thereafter, the collision object probability gradually increases. When the collision object probability exceeds the threshold of 50% at time t5, the collision object flag is set to ON.

A-4. PCS Control Process

Figure 10:
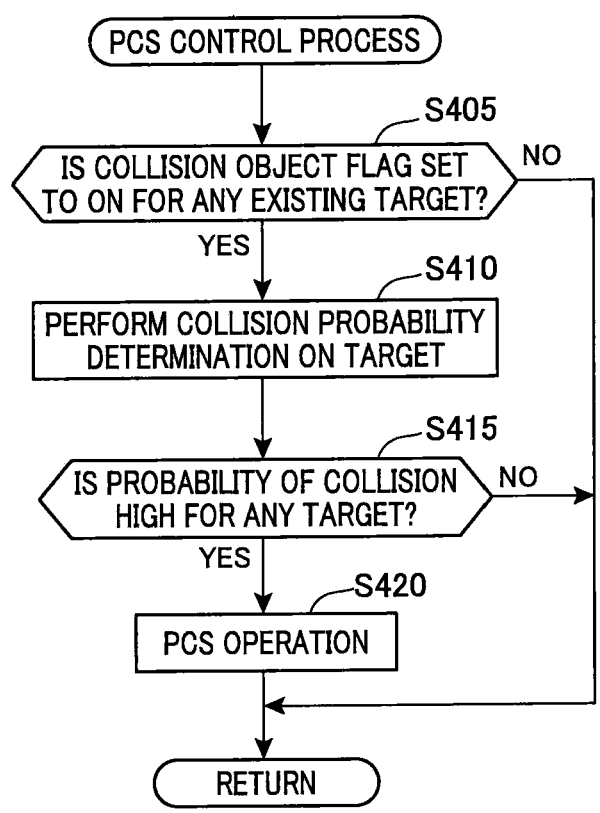
FIG. 10 is a flowchart of the flow of a PCS control process according to the first embodiment.

The main control unit 22 and the collision determining unit 25 of the driving assistance system ECU 20 repeatedly performs the PCS control process shown in FIG. 10 while the ignition is turned ON.

First, the main control unit 22 determines whether or not the collision object flag is set to ON for any of the existing targets (step S405). When determined that the collision object flag is set to ON for any of the existing targets (YES at step S405), the collision determining unit 25 performs collision probability determination regarding the probability of a collision between the target and the vehicle 100 (step S410).

Specifically, the collision determining unit 25 calculates a predicted collision time TTC for the target of which the collision object flag is set to ON. The collision determining unit 25 calculates the predicted collision time TTC based on the detection results from the sensors (such as the distance from the vehicle 100, the orientation from the perspective of the vehicle 100, and the relative speed to the vehicle 100). The predicted collision time TTC refers to the amount of time until a predicted time of collision between the vehicle 100 and the object.

When the predicted collision time TTC is shorter than a first threshold Th1 that is set in advance, the collision determining unit 25 determines that the probability of a collision between the target and the vehicle 100 is high. On the other hand, when the predicted collision time TTC is longer than the first threshold Th1, the collision determining unit 25 determines that the probability of a collision between the target and the vehicle 100 is not high.

According to the present embodiment, the first threshold Th1 is set to 0.6 seconds. The first threshold TH1 is not limited to 0.6 seconds. An arbitrary period can be set as the first threshold Th1.

The main control unit 22 determines whether or not the probability of collision is high for any target among the targets on which the collision probability determination has been performed at step S410 (step S415). When determined that the probability of collision is high for any of the targets (YES at step S415), the main control unit 22 performs at least one of the PCS controls (1) to (7) described above (step S420).

For example, when the predicted collision time TTC of a target is a second threshold Th2 (<first threshold Th1) or longer, control is performed to issue a warning to the driver using the steering 62 or the panel 82 (controls (5) and (7) described above.

When the predicted collision time TTC of the target is shorter than the second threshold Th2 and a third threshold Th3 (<second threshold Th2) or longer, control is performed to improve the responsiveness characteristics of the brake 52 (control (2)).

When the predicted collision time TTC of the target is shorter than the third threshold Th3 and a fourth threshold Th4 (<third threshold Th3) or longer, one or a plurality of the following is performed: control to close the throttle valve (control (1)), control to automatically activate the brake 52 (control (3)), collision avoidance control using the steering 62 (control (4)), and seatbelt automatic retraction control (control (7)).

"The probability of collision is high for any target among the targets on which the collision probability determination has been performed" corresponds to a second condition in the claims.

When determined that the collision object flags of all existing targets are set to OFF at above-described step S405 (NO at step S405) and determined that the probability of collision is not high for all targets at step S415 (NO at step S415), the main control unit 22 returns to above-described step 405.

As described above, the collision object flag of the first target B1 is set to OFF after time t4 in FIG. 7. Therefore, step S420 shown in FIG. 10 is not performed. As a result, erroneous operation of PCS control as a result of the iron plate 500 can be avoided.

As described above, in the driving assistance system ECU 20 according to the first embodiment, in a situation in which an erroneous estimation of the type of target may occur, such as when the vehicle is traveling on a curve, the collision object flag and the non-collision object flag are both set to OFF.

Therefore, even when the detected target is an existing target, step S145 is performed and the type of target is presumed again. Therefore, the probability of the target being accurately identified can be increased. As a result, when the vehicle 100 is approaching a non-collision object, such as the iron plate 500, occurrence of unnecessary PCS, such as automatic operation of the brake 50 or generation of light or sound from the panel 82, can be suppressed.

A-5: Comparison Example

In a driving assistance system ECU of a comparison example according to the first embodiment, when the detected target is identified as being an existing target, the type of object set for the existing target is set as is as the type of the detected object, regardless of the setting states of the collision object flag and the non-collision object flag. The type of object is then stored together with information such as the position of the detected object.

In addition, in the driving assistance system ECU of the comparison example according to the first embodiment, there is no relationship between the steering angle and the settings of the collision object flag and the non-collision object flag. Therefore, the collision object flag and the non-collision object flag are not set to OFF in response to the steering angle becoming the above-described threshold (70%) or more.

In addition, in the driving assistance system ECU of the comparison example according to the first embodiment, PCS control is operated when the collision object flag is set to ON and the probability of collision is high, in a manner similar to the driving assistance system ECU 20 according to the first embodiment.

In a manner similar to the situation shown in FIG. 4, the vehicle in the comparison example detects the first target B1 at the timing at which the vehicle approaches the curve entrance g1. The first target B1 is composed of the detection point on the iron plate 500 and the two detection points on the guardrail GR.

Figure 11:
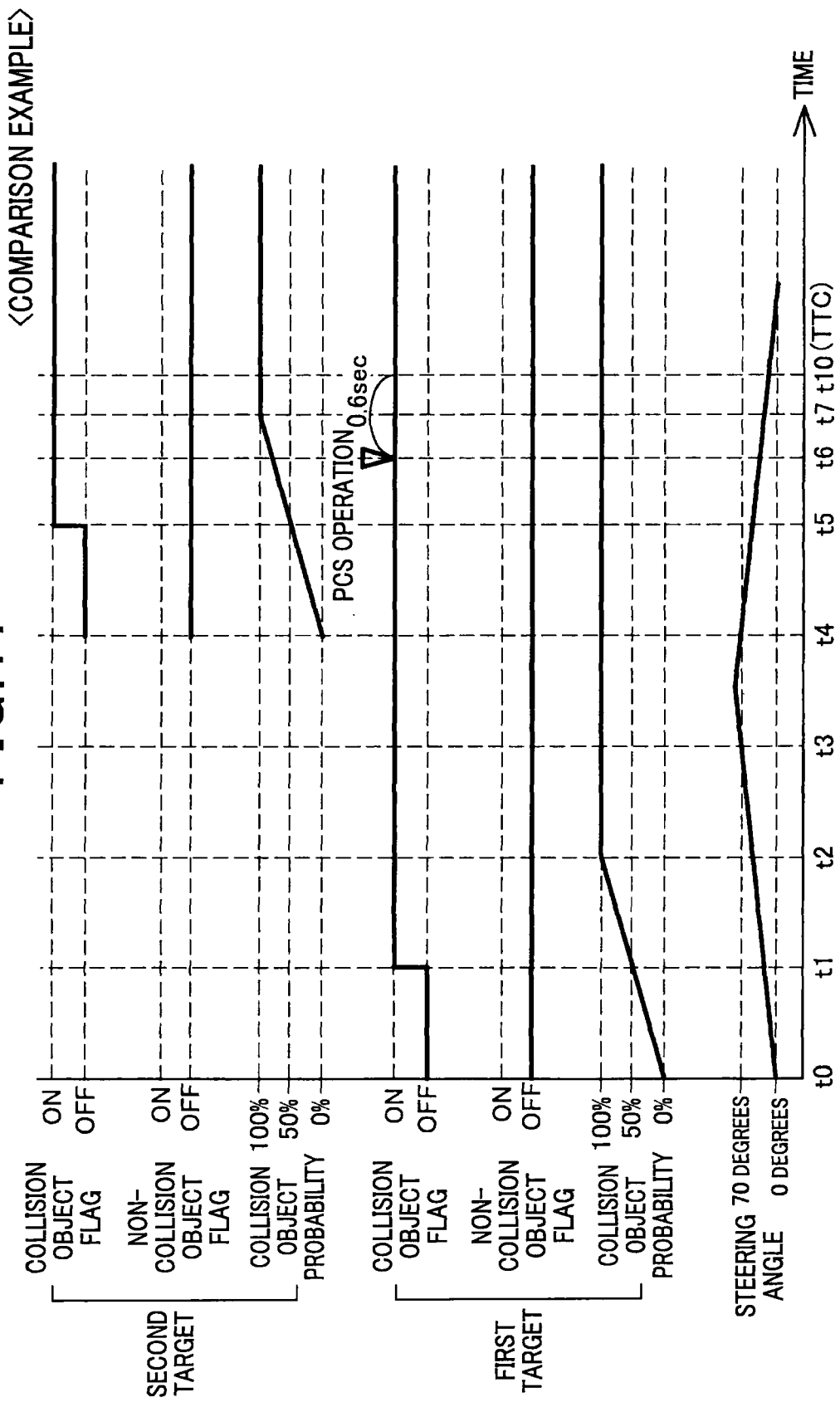
FIG. 11 is a timing chart of changes in two types of flags, collision object probability, and steering angle in a comparison example according to the first embodiment.

In addition, the vehicle identifies the type of the first target B1 as being a collision object. Therefore, as shown in FIG. 11, the collision object probability of the first target B1 increases from time t0. At time t1 when the collision object probability exceeds 50%, the collision object flag is set to ON.

Figure 12:
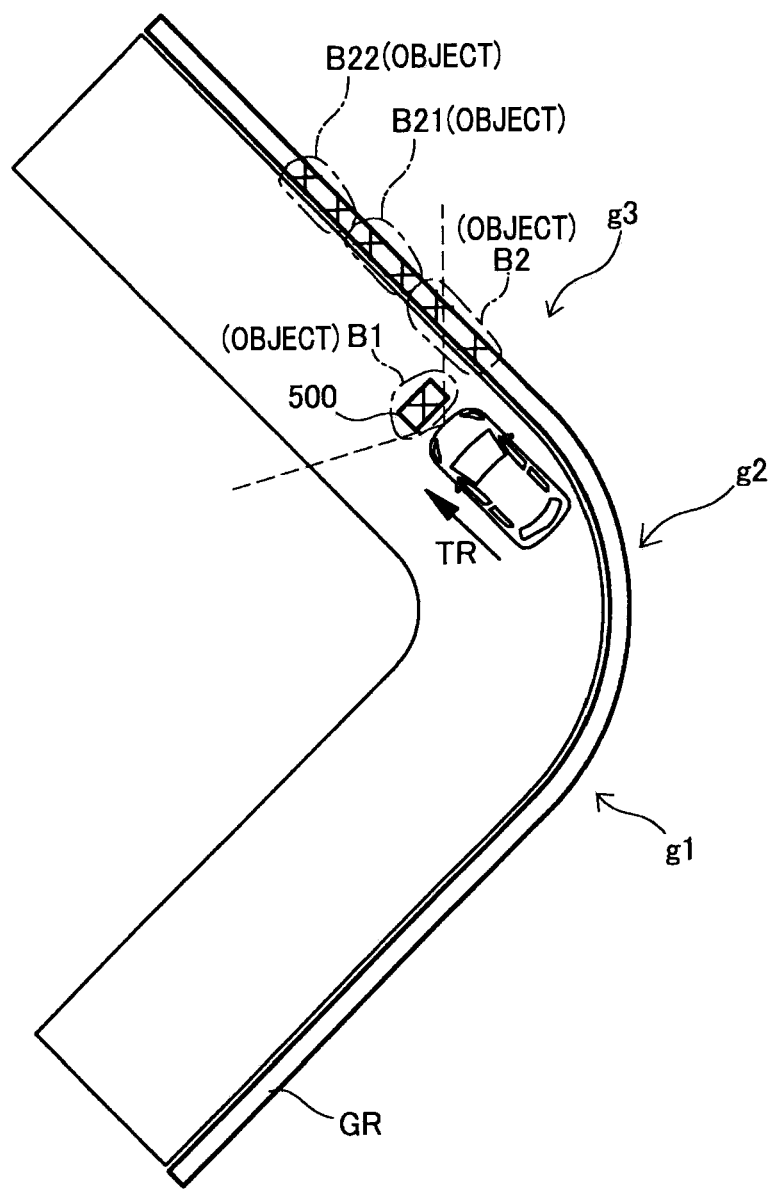
FIG. 12 is an explanatory diagram of a cruising state of the vehicle in the comparison example according to the first embodiment.

Subsequently, the situation becomes similar to the situation shown in FIG. 8. The situation then becomes the situation shown in FIG. 12. In other words, the first target B1 changes so as to be composed of the single detection point on the iron plate 500.

A new second target appears that is composed of the two detection points on the guardrail GR that had configured the first target B1 up to this point. Unlike in the first embodiment, the collision object flag of the first target B1 is not set to OFF. The collision object flag remains set to ON.

Therefore, as shown in FIG. 1, when time t6 passes, the PCS operation is performed. Time t6 is the first threshold Th1 (0.6 seconds) before the predicted collision time TTC (time t10). Therefore, an unnecessary operation, such as automatic activation of the brake 52 or generation of light or sound from the panel 82, is performed immediately before the vehicle 100 travels over the iron plate 500.

Contrary to the driving assistance system ECU of the comparison example such as that described above, in the driving assistance system ECU according to the first embodiment, when the condition "the steering angle is a threshold or more" is met, PCS control is not operated even when the probability of collision with a target is high (when the predicted collision time is the first threshold Th1 or shorter). The condition "the steering angle is a threshold or more" indicates a situation where erroneous estimation of the type of target may occur. Therefore, operation of unnecessary PCS control can be suppressed.

According to the above-described first embodiment, in a situation in which, for example, a stationary vehicle is disposed near the curve exit g3 instead of the iron plate 500, the type of target indicating the stationary vehicle is presumed to be a collision object at step S145. Therefore, after time t4 when the steering angle falls below the threshold, the collision object probability of the target increases. The collision object flag can be set to ON by time t6. Therefore, PCS control can be operated at time t6.

B. Second Embodiment

Figure 13:
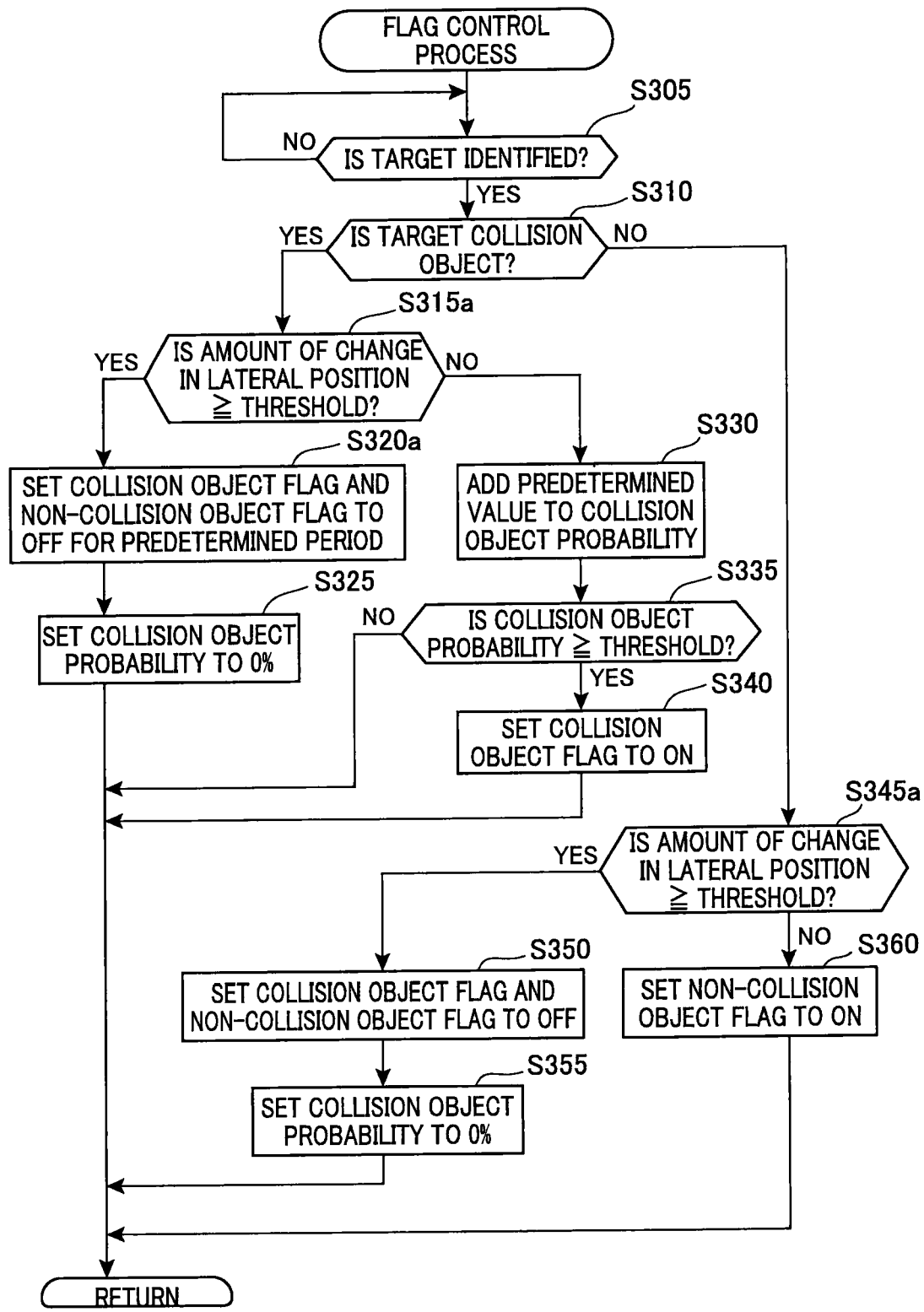
FIG. 13 is a flowchart of the flow of a flag control process according to the second embodiment.

As shown in FIG. 13, a driving assistance system ECU 20 according to a second embodiment differs from the driving assistance system ECU 20 according to the first embodiment in that, in the flag control process, step S315a is performed instead of step S315, step S320a is performed instead of step S320, and step S345a is performed instead of step S345.

Apparatus configurations, other steps in the flag control process, each step in the object identification process, and each step in the PCS control process of the driving assistance system ECU 20 according to the second embodiment are the same as those of the driving assistance system ECU 20 according to the first embodiment. Therefore, detailed descriptions thereof are omitted.

In the above-described driving assistance system ECU 20 according to the first embodiment, the condition indicating that erroneous estimation of the type of target may occur is "the steering angle is a threshold or more". When the condition is met, the collision object flag and the non-collision object flag are set to OFF. As a result, unnecessary operation of PCS control is suppressed. Conversely, in the driving assistance system ECU 20 according to the second embodiment, the condition indicating that erroneous estimation of the type of target may occur is "the amount of change (temporal change) in the lateral position of the target is a threshold or more". When the condition is met, the collision object flag and the non-collision object flag are set to OFF. As a result, unnecessary operation of PCS control is suppressed.

Specifically, as shown in FIG. 13, when determined (presumed) that the type of the identified target is the collision object (YES at step S310), the flag control unit 24 determines whether or not the amount of change in the lateral position of the identified target is a threshold or more (step S315a).

According to the present embodiment, the threshold at step S315a is set to 2.0 m. The threshold is not limited to 2.0 m. An arbitrary length may be set as the threshold. Here, "the amount of change in the lateral position" refers to the amount of change between a lateral position that has been previously identified and the lateral position that is currently identified, for the same target.

According to the present embodiment, the amount of change in the lateral position is calculated by the object identifying unit 23 when identifying the position of the target. The amount of change in the lateral position is calculated based on the past and latest positional information of the same target.

According to the present embodiment, "the amount of change in the lateral position of the identified target is a threshold or more" at step S315a corresponds to a first condition in the claims. In addition, according to the present embodiment, the object identifying unit 23 corresponds to an estimating unit (classifying unit), a position identifying unit, and a change amount calculating unit in the claims.

When determined that the amount of change in the lateral position of the identified target is the threshold or more at above-described step S315a (YES at step S315a), the flag control unit 24 sets the collision object flag and the non-collision object flag of the identified target to OFF for a predetermined period (step S320a).

According to the present embodiment, the predetermined period at step S320 is set to 0.6 seconds. The predetermined period is not limited to 0.6 seconds. An arbitrary time period may be set as the threshold. After performing step S320a, the flag control unit 24 performs above-described step S325. Therefore, the collision object flag and the non-collision object flag of the identified target are set to OFF. The collision target probability is set to 0%.

When determined that the amount of change in the lateral position of the identified target is not the threshold or more at above-described step S315a (NO at step S315a), the flag control unit 24 performs above-described step S330.

When determined that the type of the identified target is not a collision object at step S310 (NO at step S310), the flag control unit 24 determines whether or not the amount of change in the lateral position of the identified target is the threshold or more (step S345a). Step S345a is the same as above-described step S315a. Therefore, description thereof is omitted.

Figure 14:
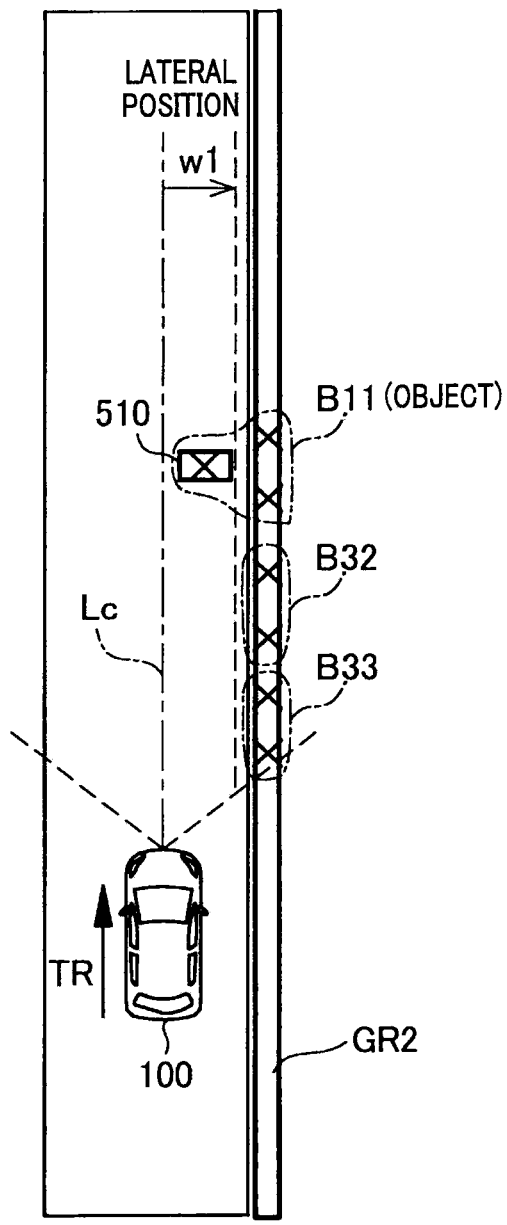
FIG. 14 is a first explanatory diagram of a cruising state of the vehicle according to the second embodiment.

For example, in the situation shown in FIG. 14, three targets B11, B32, and B33 are identified. In the situation shown in FIG. 14, the vehicle 100 is traveling on a straight road. A guardrail GR2 is set along the road on the right side of the road.

In addition, an iron plate 510 is set on the road surface near the guardrail GR2. The first target B11 is composed of a single detection point on the iron plate 510 and two detection points on the guardrail GR2. The other two targets B32 and B33 are each composed of two detection points on the guardrail GR2. The depth of the first target B11 is relatively large. Therefore, the first target B11 is presumed to be a collision object.

At step S110 in the object identification process shown in FIG. 3, a distance w1 from a virtual line Lc to the center of the first target B11 (the center of the three detection points) is identified as the lateral position of the first target B11. The virtual line Lc passes through the center of the vehicle 100 along the traveling direction of the vehicle 100.

Figure 15:
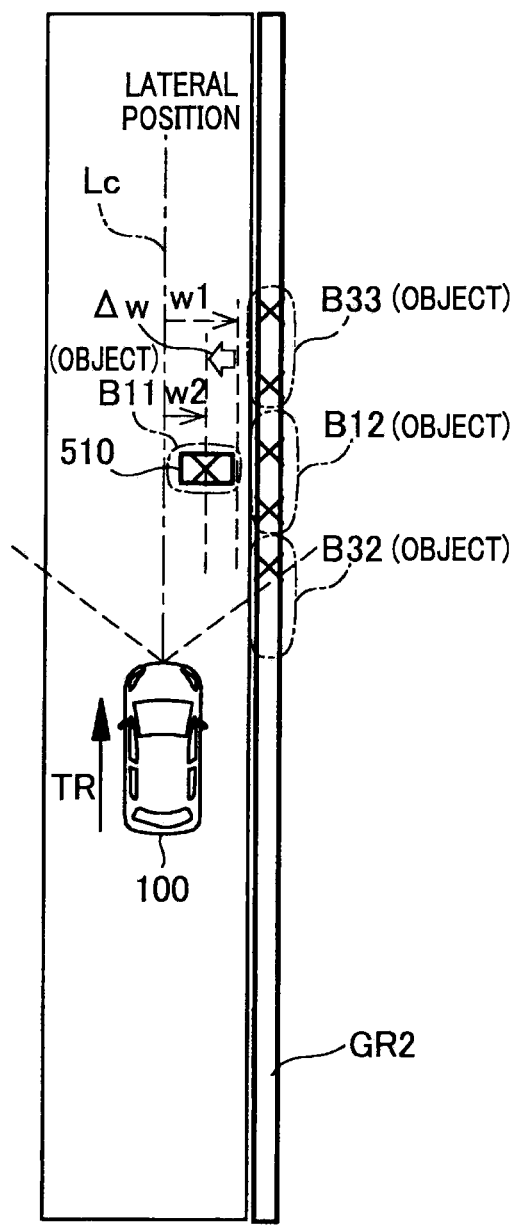
FIG. 15 is a second explanatory diagram of a cruising state of the vehicle according to the second embodiment.

FIG. 15 shows a situation in which the vehicle 100 has further traveled in the traveling direction from the situation in FIG. 14. As shown in FIG. 15, when the vehicle 100 nears the iron plate 510, the three detection points that have been identified as the first target B11 in the situation in FIG. 14 are identified as being two targets.

Specifically, the target composed of the detection point on the iron plate 510 is identified as being the first target B11 which is an existing target. A target composed of the two detection points on the guardrail GR2 is identified as being a newly emergent target (second target B12).

Immediately before the situation in FIG. 15, the type of the first target B11 is identified as being a (newest) "collision object" identified in the situation in FIG. 14. In FIG. 15, the target B33 composed of two detection points positioned further behind the second target B12 in the traveling direction TR on the guardrail GR2 is newly identified.

Figure 16:
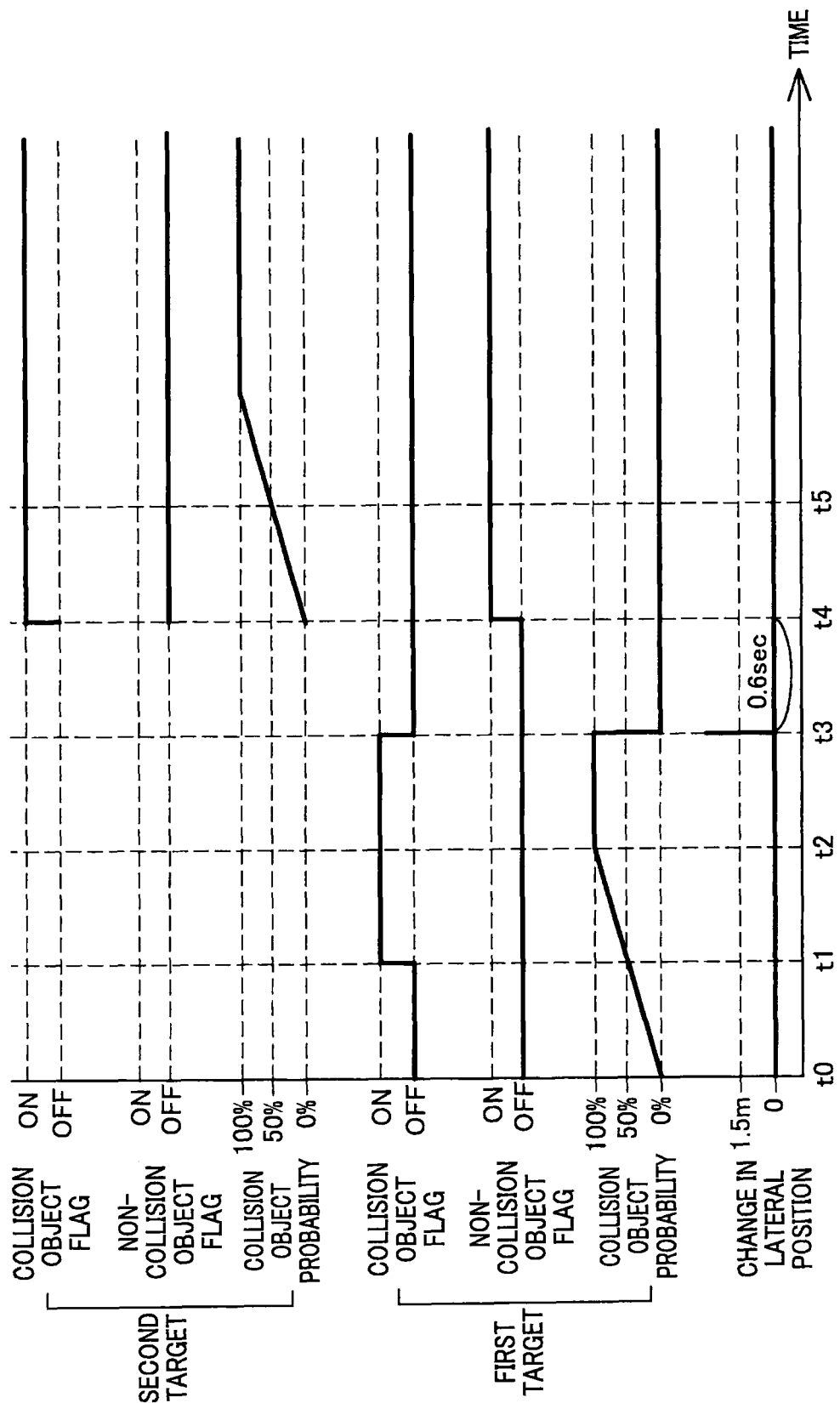
FIG. 16 is a timing chart of changes in two types of flags, collision object probability, and amount of change in lateral position according to the second embodiment.

As indicated at time t0 to time t3 in FIG. 16, when identification (estimation) of the first target B11 as a collision object starts in the situation in FIG. 14, the collision object probability of the first target B11 gradually increases. At time t1 when the collision object probability exceeds the threshold of 50%, the collision object flag of the first target B11 is set to ON.

Here, in the situation in FIG. 15, a lateral position w2 of the first target B11 is the lateral position of the detection point on the iron plate 510. Therefore, the lateral position w2 changes to become closer to the virtual line Lc than the lateral position w1 of the first target B11 in FIG. 14. As a result, the amount of change $\Delta w$ in the lateral position of the first target B11 increases.

When the amount of change $\Delta w$ exceeds a threshold (2.0 m), as shown in FIG. 16, the collision object flag and the non-collision object flag of the first target B11 are set to OFF for 0.6 seconds, from time t3 to time t4. As a result, in the situation shown in FIG. 17, step S145 of the object identification process shown in FIG. 3 is performed.

Figure 17:
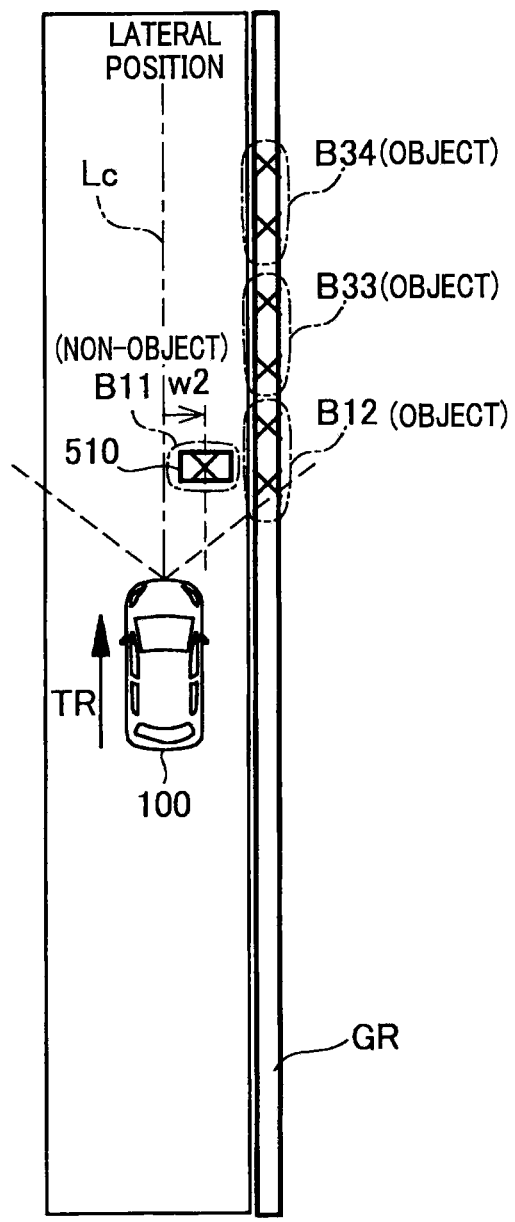
FIG. 17 is a third explanatory diagram of a cruising state of the vehicle according to the second embodiment.

The type of the first target B11 is presumed again. The situation shown in FIG. 17 is a situation in which the vehicle 100 has further traveled in the traveling direction TR from the situation in FIG. 15. In the situation in FIG. 17, the vehicle 100 is sufficiently near the first target B11 (iron plate 510). Therefore, the type of the first target B11 can be accurately identified (presumed) as being a non-collision object. As a result, as shown in FIG. 16, the non-collision object flag of the first target B11 is set to ON at time t4.

In addition, the collision object flag of the first target B11 can remain set to OFF after time t4. Therefore, PCS control is not operated even when the vehicle 100 further travels from the state shown in FIG. 17 and the time is 0.6 seconds before the estimated time at which the vehicle 100 passes over the iron plate 510.

As described above, in the driving assistance system ECU 20 according to the second embodiment, the collision object flag and the non-collision object flag are both set to OFF for a predetermined period when the amount of change in the lateral position of the target becomes greater than a threshold.

The amount of change in the lateral position of the target becoming greater than a threshold refers to a situation in which erroneous estimation of the type of target may occur because a single target composed of a plurality of detection points on a plurality of different types of objects separate into targets composed of detection points on each individual object.

Therefore, in a manner similar to that according to the first embodiment, even when the detected target is an existing target, step S145 is performed. The type of target is presumed again. Therefore, the probability of accurate identification of each of the plurality of targets that have separated can be increased.

As shown in FIG. 18, in a driving assistance system ECU of a comparison example according to the second embodiment, in a manner similar to the driving assistance system ECU of the comparison example according to the first embodiment, when a detected target is presumed to be an existing target, the type of object set for the existing target is set as is as the type of the detected object, regardless of the setting states of the collision object flag and the non-collision object flag. The type of object is then stored together with information such as the position of the detected object.

In addition, in the driving assistance system ECU of the comparison example, there is no relationship between the amount of change in the lateral position and the settings of the collision object flag and the non-collision object flag. Therefore, the collision object flag and the non-collision object flag are not set to OFF in response to the amount of change in the lateral position becoming the above-described threshold (2.0 m) or more.

In addition, in the driving assistance system ECU of the comparison example according to the second embodiment, PCS control is operated when the collision object flag is set to ON and the probability of collision is high, in a manner similar to the driving assistance system ECU 20 according to the second embodiment.

In the driving assistance system ECU of the comparison example according to the second embodiment, even when the situation becomes similar to that shown in FIG. 15 and the amount of change Δw in the lateral position becomes the threshold (2.0 m) or more, the collision object flag of the first target B11 remains set to ON as shown in FIG. 18.

Therefore, as shown in FIG. 18, when time t6 passes, the PCS operation is performed. Time t6 is the first threshold Th1 (0.6 seconds) before the predicted collision time TTC (time t10). Therefore, an unnecessary operation, such as automatic application of the brake 52 or generation of light or sound from the panel 82, is performed when the vehicle 100 travels over the iron plate 510.

Conversely, in the driving assistance system ECU 20 according to the second embodiment, when the condition "the amount of change in the lateral direction is a threshold or more" is met, PCS control is not operated even when the probability of collision with a target is high (when the predicted collision time is the first threshold Th1 or shorter). The condition "the amount of change in the lateral direction is a threshold or more" indicates a situation where erroneous estimation of the type of target may occur. Therefore, operation of unnecessary PCS control can be suppressed.

According to the above-described second embodiment, in a situation in which, for example, a stationary vehicle is disposed instead of the iron plate 510, the type of target indicating the stationary vehicle is identified (presumed) as being a collision object at step S145. Therefore, after time t4, the collision object probability of the target increases. The collision object flag can be set to ON by time t6. Therefore, PCS control can be operated at time t6.

C. Variation Examples

C-1. First Variation Example

The configuration of the vehicle 100 according to the above-described embodiments is merely an example. Various modifications to the configuration of the vehicle 100 are possible. For example, according to the above-described embodiments, the millimeter-wave radar 11 is used to detect the object ahead of the vehicle 100. However, other sensors, such as a camera, may be used instead of the millimeter-wave radar 11. Alternatively, a plurality of sensors (such as the millimeter-wave radar 11 and a camera) may be used to improve the accuracy of object detection.

In addition, according to the above-described embodiments, the driving assistance system ECU 20 includes the PCS control unit 21, the ACC control unit 27, the LKA control unit 28, and the LDW control unit 29. However, the driving assistance system ECU 20 may optionally not include at least one of these control units depending on the type of driving assistance control to be performed.

Furthermore, according to the above-described embodiments, each functional unit (the main control unit 22, the object identifying unit 23, the flag control unit 24, the collision determining unit 25, and the tracking data storage unit 26) included in the PCS control unit 21 is configured by a single ECU (driving assistance system ECU).

However, a plurality of functional units may be configured so as to be divided among a plurality of ECUs. In this configuration, the ECU actualizing the object identifying unit 23 and the flag control unit 24 corresponds to the target recognition apparatus in the claims. In addition, for example, a plurality of ECUs (an ECU group) actualizing all of the functions correspond to the target recognition apparatus in the claims.

C-2. Second Variation Example

The types of PCS control given the reference numbers (1) to (7) and described according to the above-described embodiments are merely examples. As PCS control, other types of control may be performed to avoid collision between an object and the vehicle 100 or to reduce impact caused by a collision.

C-3. Third Variation Example

According to the above-described first embodiment, the condition indicating that erroneous estimation of the type of target may occur is "the steering angle is a threshold or more". According to the above-described second embodiment, the condition indicating that erroneous estimation of the type of target may occur is "the amount of change in the lateral position of the target is a threshold or more". However, the present disclosure is not limited to these conditions.

For example, the number of targets within a predetermined area ahead of and near the vehicle 100 (such as a rectangular area having a length of 1 m along the traveling direction, a length of 3 m in a direction perpendicular to the traveling direction, and of which the center is positioned 1 m from the front end portion of the vehicle 100 along the traveling direction) may be counted.

The condition indicating that erroneous estimation of the type of target may occur is "the number of targets in the area has increased". The collision object flag and the non-collision object flag may be set to OFF based on this condition. A reason for this is that a situation in which the number of targets in the predetermined area increases is presumed to be a situation similar to that according to the above-described second embodiment.

In addition, for example, the condition indicating that erroneous estimation of the type of target may occur may be "the yaw rate (rotation angular velocity) detected by the yaw rate sensor 31 is a threshold or more". The collision object flag and the non-collision object flag may be set to OFF based on this condition. A reason for this is that a situation in which the yaw rate is the threshold or more is presumed to be a situation similar to that according to the above-described first embodiment.

In addition, for example, the vehicle 100 may store map information in advance. A current traveling position may be acquired using a global positioning system (GPS). The vehicle 100 may be configured to determine whether or not the vehicle 100 is traveling on a curve based on the current traveling position and the map information.

In addition, the condition indicating that erroneous estimation of the type of target may occur may be "the vehicle 100 is traveling on a curve". The collision object flag and the non-collision object flag may be set to OFF based on this condition. A reason for this is that a situation in which the vehicle 100 is traveling on a curve is presumed to be a situation similar to that according to the above-described first embodiment.

Moreover, the condition indicating that erroneous estimation of the type of target may occur may be a condition that is a combination of at least two of the conditions given in the above-described embodiments and variation examples.

In other words, in general, an arbitrary condition may be used in the target recognition apparatus of the present embodiment, the arbitrary condition being related to the cruising state of the vehicle and indicating that erroneous estimation of the type of target may occur when presuming whether or not an object is to be used for control to enable a vehicle to perform a predetermined operation (object type estimation).

C-4. Fourth Variation Example

According to the above-described embodiments, at step S415 in the PCS control process, the probability of collision is determined to be high when the predicted collision time TTC is 0.6 seconds or less. However, the present disclosure is not limited thereto.

For example, whether or not the target is present in a predetermined area (such as a rectangular area having a length of 1 m along the traveling direction, a length of 3 m in a direction perpendicular to the traveling direction, and of which the center is positioned 1 m from the front end portion of the vehicle 100 along the traveling direction) ahead of the vehicle 100 may be determined.

When determined that the target is present in the predetermined area, the probability of collision may be determined to be high. In other words, in general, a predetermined condition indicating that the probability of a collision between the vehicle 100 and the target is high may be used in the target recognition apparatus of the present disclosure.

C-5. Fifth Variation Example

According to the above-described embodiments, the collision object flag and the non-collision object flag are used to enable PCS control to be operated when conditions are met. The conditions are: a condition indicating that erroneous estimation may occur in target type estimation; and a condition indicating that the probability of a collision between the vehicle 100 and the target is high. However, the collision object flag and the non-collision object flag may be omitted.

For example, a configuration is possible in which, instead of step S405 in the PCS control process shown in FIG. 10, step S315 (determining whether or not the steering angle is a threshold or more) in the flag control process according to the first embodiment shown in FIG. 6 is performed. When determined that the steering angle is not the threshold or more, above-described step S410 is performed. When determined that the steering angle is the threshold or more, the process may return to step S315. In this configuration, the flag control process shown in FIG. 6 can be omitted.

In addition, for example, a configuration is possible in which, instead of step S405 in the PCS control process shown in FIG. 10, step S315a (determining whether or not the amount of change in the lateral position is a threshold or more) in the flag control process according to the second embodiment shown in FIG. 13 is performed. When determined that the amount of change in the lateral position is not the threshold or more, above-described step S410 is performed. When determined that the amount of change in the lateral position is the threshold or more, the process returns to step S315a.

In this configuration, the flag control process shown in FIG. 13 can be omitted. As is clear from the above-described embodiments and variation examples, a configuration in which the vehicle is prohibited from performing a predetermined operation when a predetermined first condition is met may be used in the target recognition apparatus of the present disclosure. The predetermined first condition indicates that erroneous classification may occur in object type estimation (classification).

C-6. Sixth Variation Example

In addition, the present disclosure can be applied to other types of vehicle control, in addition to PCS control. Here, vehicle control is that in which the vehicle 100 is made to perform a predetermined operation. The other types of vehicle control include ACC control, LKA control, LDW control, and the like. Even in these other types of vehicle control, the operation of vehicle control can be suppressed for types of targets that do not require vehicle control. In addition, vehicle control can be applied to types of targets that require vehicle control.

C-7. Seventh Variation Example

According to the above-described embodiments, PCS control is not operated in situations where erroneous estimation of the type of target may occur, such as when the vehicle 100 is traveling on a curve or when the amount of change in the lateral position of the target is a threshold or more. However, the present disclosure is not limited thereto.

For example, in the flag control process according to the first embodiment, when determined that the steering angle is the threshold or more (YES at step S315), instead of step S320 and step S325, a process may be performed in which "a predetermined value is added to the latest collision object probability of the identified target, and the sum thereof is identified as being the new collision object probability". Thereafter, step S335 and subsequent processes may be performed.

In this configuration, the predetermined value to be added in the process performed instead of step S320 and step S325 may be smaller than the predetermined value added at step S330 (the predetermined value that is added when the steering angle is less than the threshold). As a result, when the vehicle 100 is traveling on a curve, operation of PCS control can be suppressed compared to when the vehicle 100 is not traveling on a curve.

In addition, for example, a steering angle flag may be newly provided. In the flag control process according to the first embodiment, when determined that the steering angle is the threshold or more (YES at step S315), instead of S320 and step S325, a process for setting the steering angle flag to ON may be performed. Thereafter, step S330 and subsequent processes may be performed.

In addition, when performing step S420 (operation of PCS control) in the PCS control process shown in FIG. 10, whether or not the steering angle flag is set to ON may be determined. When determined that the steering flag is set to ON, the amount of control may be suppressed compared to when the steering angle flag is set to OFF.

For example, when "control to decelerate (stop) the vehicle 100 by automatically activating the brake 52" is performed as PCS control, the operation amount of the brake 52 when the steering angle flag is set to ON may be reduced compared to when the steering angle flag is set to OFF.

In addition, for example, "control to decelerate (stop) the vehicle 100 by automatically activating the brake 52" may be performed when the steering angle flag is set to OFF. "Control to emit light or sound from the panel 82 to warn the driver" may be performed when the steering angle flag is set to ON.

In this way, the executed control (type) may be changed. As a result, a configuration is possible in which lighter control is performed when the steering angle is the predetermined value or more, compared to when the steering angle is less than the predetermined value.

The above-described variation example apply to the first embodiment. However, in the second embodiment as well, operation of PCS control may be further suppressed when the amount of change in the lateral of the target is the threshold or more, compared to when the amount of change in the lateral position is less than the threshold.

The present disclosure is not limited to the above-described embodiments and variation examples. The present disclosure can be actualized by various configurations without departing from the scope of the disclosure. For example, the technical features in the embodiments and variation examples corresponding to the technical features of each aspect described in the summary can be exchanged or combined as appropriate to solve some or all of the above-described issues or to achieve some or all of the above-described effects. In addition, unless stated in the present specification as being an essential feature, the technical features can be omitted as appropriate.

What is claimed is:

1. A target recognition apparatus mounted to a vehicle, the target recognition apparatus comprising:
   a detecting unit that detects an object that is present in a traveling direction of the vehicle, and acquires information for estimation that is used to perform an object type estimation to presume whether or not the detected object is an object to be used in control for enabling the vehicle to perform a predetermined operation;
   an estimating unit that performs the object type estimation based on the information for estimation, wherein when a predetermined first condition is met, the control for enabling the vehicle to perform a predetermined operation is prohibited or suppressed, the predetermined first condition indicating that erroneous estimation may occur in the object type estimation; and
   an operation control unit that enables the vehicle to perform the predetermined operation when a predetermined second condition is met, the predetermined second condition indicating that the probability of collision between the vehicle and the object is high,
   wherein, when the first condition is met, the operation control unit suppresses or prohibits the control for enabling the vehicle to perform a predetermined operation when the second condition is met.

2. A target recognition apparatus mounted to a vehicle, the target recognition apparatus comprising:
   a detecting unit that detects an object that is present in a traveling direction of the vehicle, and acquires information for estimation that is used to perform an object type estimation to presume whether or not the detected object is an object to be used in control for enabling the vehicle to perform a predetermined operation;
   an estimating unit that performs the object type estimation based on the information for estimation, wherein, when a predetermined first condition is met, the control for enabling the vehicle to perform a predetermined operation is prohibited or suppressed, the predetermined first condition indicating that erroneous estimation may occur in the object type estimation; and
   a steering angle detecting unit that detects a steering angle of a steering in the vehicle, the predetermined first condition including a condition that the steering angle is a predetermined angle or more.

3. The target recognition apparatus according to claim 1, further comprising:
   a steering angle detecting unit that detects a steering angle of a steering in the vehicle, the first condition including a condition that the steering angle is a predetermined angle or more.

4. A target recognition apparatus mounted to a vehicle, the target recognition apparatus comprising:
   a detecting unit that detects an object that is present in a traveling direction of the vehicle, and acquires information for estimation that is used to perform an object type estimation to presume whether or not the detected object is an object to be used in control for enabling the vehicle to perform a predetermined operation;
   an estimating unit that performs the object type estimation based on the information for estimation, wherein, when a predetermined first condition is met, the control for enabling the vehicle to perform a predetermined operation is prohibited or suppressed, the predetermined first condition indicating that erroneous estimation may occur in the object type estimation; and
   a yaw rate detecting unit that detects an angular velocity of the vehicle, the first condition including a condition that the angular velocity is a predetermined angular velocity or more.

5. The target recognition apparatus according to claim 1, further comprising:
   a yaw rate detecting unit that detects an angular velocity of the vehicle, the first condition including a condition that the angular velocity is a predetermined angular velocity or more.

6. A target recognition apparatus mounted to a vehicle, the target recognition apparatus comprising:
   a detecting unit that detects an object that is present in a traveling direction of the vehicle, and acquires information for estimation that is used to perform an object type estimation to presume whether or not the detected object is an object to be used in control for enabling the vehicle to perform a predetermined operation;
   an estimating unit that performs the object type estimation based on the information for estimation, wherein, when a predetermined first condition is met, the control for enabling the vehicle to perform a predetermined operation is prohibited or suppressed, the predetermined first condition indicating that erroneous estimation may occur in the object type estimation;

an object identifying unit that identifies a lateral position of the detected object that is a position in a direction perpendicular to a traveling direction of the vehicle;

a storage unit that stores information indicating the lateral position of the detected object; and a change amount calculating unit that calculates an amount of temporal change in the lateral position of the identified target, wherein the first condition includes a condition that amount of temporal change is equal to or larger than a predetermined amount.

7. A target recognition apparatus mounted to a vehicle, the target recognition apparatus comprising:

a detecting unit that detects an object that is present in a traveling direction of the vehicle, and acquires information for estimation that is used to perform an object type estimation to presume whether or not the detected object is an object to be used in control for enabling the vehicle to perform a predetermined operation; and an estimating unit that performs the object type estimation based on the information for estimation, wherein:

when a predetermined first condition is met, the control for enabling the vehicle to perform a predetermined operation is prohibited or suppressed, the predetermined first condition indicating that erroneous estimation may occur in the object type estimation; and the first condition includes a condition that the number of the detected object has increased within an area of a predetermined size that is located at a predetermined distance or less in a traveling direction of the vehicle.

8. The target recognition apparatus according to claim 1, wherein:

the predetermined operation includes at least one of:
an operation to avoid collision of the vehicle with the object;
an operation to reduce impact caused by the collision; and
an operation to notify a user that the probability of the collision is high.

9. A target recognition method comprising:

detecting, by a detecting unit for a target recognition apparatus mounted to a vehicle, an object that is present in a traveling direction of a vehicle, and acquires information for estimation that is used to perform an object type estimation to presume whether or not the detected object is an object to be used in control for enabling the vehicle to perform a predetermined operation;

performing, an estimating unit for the target recognition apparatus, the object type estimation based on the information for estimation, wherein, when a predetermined first condition is met, the control for enabling the vehicle to perform a predetermined operation is prohibited or suppressed, the predetermined first condition indicating that erroneous estimation may occur in the object type estimation; and enabling, by an operation control unit, the vehicle to perform the predetermined operation when a predetermined second condition is met, the predetermined second condition indicating that the probability of collision between the vehicle and the object is high, wherein, when the first condition is met, the operation control unit suppresses or prohibits the control for enabling the vehicle to perform a predetermined operation when the second condition is met.

* * * * *